(12) United States Patent
Davis et al.

(10) Patent No.: US 8,801,929 B2
(45) Date of Patent: *Aug. 12, 2014

(54) TRASH TOLERANT FILTER SUPPORT FOR A DISC FILTER

(75) Inventors: William E. Davis, Brookfield, WI (US); Peter J. Petit, Pewaukee, WI (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/173,517

(22) Filed: Jul. 15, 2008

(65) Prior Publication Data

US 2009/0020483 A1   Jan. 22, 2009

Related U.S. Application Data

(60) Provisional application No. 60/950,476, filed on Jul. 18, 2007, provisional application No. 60/950,484, filed on Jul. 18, 2007.

(51) Int. Cl.
| | | |
|---|---|---|
| *B01D 33/23* | (2006.01) | |
| *B01D 33/21* | (2006.01) | |
| *B01D 33/00* | (2006.01) | |
| *B01D 33/50* | (2006.01) | |

(52) U.S. Cl.
CPC ............ *B01D 33/23* (2013.01); *B01D 33/0093* (2013.01); *B01D 33/50* (2013.01); *B01D 2201/12* (2013.01)
USPC ............ 210/331; 210/345; 210/347; 210/487

(58) Field of Classification Search
USPC ......... 210/324, 326, 331, 345–346, 227–228, 210/486–487, 347
See application file for complete search history.

(56) References Cited

U.S. PATENT DOCUMENTS

| | | | |
|---|---|---|---|
| 1,685,118 A | 9/1928 | Campbell | |
| 1,712,258 A | 5/1929 | Compain | ...................... 210/394 |

(Continued)

FOREIGN PATENT DOCUMENTS

| | | |
|---|---|---|
| CA | 2023302 A1 | 2/1991 |
| CA | 2070341 A1 | 12/1992 |

(Continued)

OTHER PUBLICATIONS

PCT International Search Report dated Oct. 10, 2008 for PCT International Application No. PCT/US08/08671.

(Continued)

*Primary Examiner* — David C Mellon

(57) ABSTRACT

A filter device for filtering a liquid which includes trash. The device includes a drum for receiving the liquid and trash, wherein the drum includes at least one drum aperture. The device further includes a first pair of filter panels which are adapted for filtering the liquid. The filter panels are spaced apart to form a cavity for receiving the liquid and trash. The device further includes a frame for supporting the filter panels, wherein the frame is coupled to the drum. The frame includes a frame aperture wherein the frame aperture and the cavity form a volume having a cross sectional area sized substantially equal to or greater than the drum aperture and wherein said volume extends to a second pair of filter panels to enable liquid and trash which pass through the drum aperture to also pass through the frame aperture to the second pair of filter panels.

17 Claims, 24 Drawing Sheets

(56) References Cited

U.S. PATENT DOCUMENTS

| | | | |
|---|---|---|---|
| 1,804,934 A | 5/1931 | Hoyt et al. | |
| 1,826,485 A | 10/1931 | Thorne | |
| 1,833,315 A | 11/1931 | Burhans | 210/499 |
| 2,022,069 A | 11/1935 | Bryan | |
| 2,076,104 A | 4/1937 | Vinton | |
| 2,464,223 A | 3/1949 | Genter | |
| 2,964,194 A | 12/1960 | Oliver, Jr. et al. | 210/486 |
| 3,163,601 A | 12/1964 | Ericson et al. | 210/196 |
| 3,193,105 A | 7/1965 | Putnam et al. | |
| 3,331,512 A * | 7/1967 | Vore | 210/487 |
| 3,363,770 A | 1/1968 | Glos, II | 210/345 |
| 3,369,668 A | 2/1968 | Glos, II | 210/345 |
| 3,471,026 A | 10/1969 | Riker et al. | |
| 3,485,376 A | 12/1969 | Peterson et al. | |
| 3,610,419 A | 10/1971 | Vallee | 210/486 |
| 3,643,803 A | 2/1972 | Glos, II | 210/232 |
| 3,692,181 A | 9/1972 | Davis | |
| 3,948,779 A | 4/1976 | Jackson | 210/331 |
| 4,139,472 A | 2/1979 | Simonson | 210/232 |
| 4,162,982 A | 7/1979 | Chesner | 210/486 |
| 4,256,580 A | 3/1981 | Rimmele | 210/151 |
| 4,268,385 A | 5/1981 | Yoshikawa | 210/150 |
| 4,330,405 A | 5/1982 | Davis et al. | 210/331 |
| 4,346,008 A | 8/1982 | Leighton et al. | |
| 4,617,122 A | 10/1986 | Kruse et al. | |
| 4,639,315 A | 1/1987 | Fuchs et al. | |
| 4,655,920 A | 4/1987 | Ragnegard | 210/331 |
| 4,710,294 A | 12/1987 | Ziller | |
| 4,781,835 A | 11/1988 | Bahr et al. | |
| 4,814,093 A | 3/1989 | Frykhult | 210/780 |
| 4,838,910 A | 6/1989 | Stollenwerk et al. | 55/385.2 |
| 4,865,732 A | 9/1989 | Garrant et al. | 210/232 |
| 4,950,403 A | 8/1990 | Hauff et al. | 210/486 |
| 5,037,562 A | 8/1991 | Tarves, Jr. | |
| 5,076,924 A | 12/1991 | Persson et al. | 210/474 |
| 5,084,174 A | 1/1992 | Perala et al. | 210/331 |
| 5,087,358 A | 2/1992 | Massignani | 210/195.1 |
| 5,227,065 A | 7/1993 | Strid | 210/331 |
| 5,242,590 A | 9/1993 | Thomson et al. | 210/331 |
| 5,296,143 A | 3/1994 | Frykhult | 210/331 |
| 5,304,304 A * | 4/1994 | Jakobson et al. | 210/331 |
| 5,330,645 A | 7/1994 | Geldmacher | 210/327 |
| 5,330,646 A | 7/1994 | Frykhult | 210/331 |
| 5,635,062 A | 6/1997 | Cameron et al. | 210/232 |
| 5,647,982 A | 7/1997 | Haythornthwaite | 210/346 |
| 5,667,680 A | 9/1997 | Haeffner | 210/331 |
| 5,685,983 A | 11/1997 | Frykhult | 210/393 |
| 5,766,466 A | 6/1998 | Peterson | 210/323.1 |
| 5,792,352 A | 8/1998 | Scheucher et al. | 210/331 |
| 5,804,071 A * | 9/1998 | Haeffner | 210/393 |
| 5,820,756 A | 10/1998 | McEwen et al. | 210/486 |
| 5,893,972 A | 4/1999 | Peterson | |
| 5,928,396 A | 7/1999 | Choi | 55/379 |
| 6,113,783 A | 9/2000 | Strid et al. | |
| 6,231,761 B1 | 5/2001 | Mohlin et al. | 210/232 |
| 6,231,764 B1 | 5/2001 | Wilkins | |
| 6,447,617 B1 | 9/2002 | Bergmann | 134/32 |
| 6,461,507 B1 | 10/2002 | Ishigaki et al. | |
| D497,660 S | 10/2004 | Danielsson et al. | D23/209 |
| 7,255,723 B2 | 8/2007 | Choi et al. | 55/499 |
| 7,293,659 B2 | 11/2007 | Grace | 210/404 |
| 7,314,556 B2 | 1/2008 | Sheets et al. | 210/331 |
| 7,597,805 B2 | 10/2009 | Danielsson et al. | 210/332 |
| 8,118,175 B2 | 2/2012 | Davis et al. | |
| 8,343,248 B2 | 1/2013 | Suzuki et al. | |
| 2002/0050283 A1 | 5/2002 | Bergmann | 134/33 |
| 2002/0195388 A1 | 12/2002 | Sierens et al. | 210/486 |
| 2004/0232076 A1 | 11/2004 | Zha et al. | 210/636 |
| 2005/0082217 A1 | 4/2005 | Hagg et al. | |
| 2005/0121381 A1 | 6/2005 | Sheets et al. | |
| 2011/0024347 A1 | 2/2011 | Larsson et al. | |

FOREIGN PATENT DOCUMENTS

| | | | |
|---|---|---|---|
| CA | 2149090 | 11/1996 | B01D 29/07 |
| CN | 1281378 A | 1/2001 | |
| CN | 1557525 A | 12/2004 | |
| CN | 1742133 A | 3/2006 | |
| CN | 1753716 A | 3/2006 | |
| EP | 1090665 A2 | 4/2001 | |
| EP | 1596958 | 6/2006 | B01D 33/23 |
| FR | 2595957 | 9/1987 | B01D 25/04 |
| GB | 957991 | 5/1964 | |
| JP | 2002126800 A | 8/2002 | C02F 11/12 |
| SE | 224131 C1 | 1/1969 | |
| SE | 526692 C2 | 10/2005 | |
| WO | WO 9112067 | 8/1991 | B01D 33/21 |
| WO | 9419088 A1 | 9/1994 | |
| WO | WO 9735656 | 10/1997 | B01D 33/23 |
| WO | 9811972 A1 | 3/1998 | |
| WO | 9930797 A1 | 6/1999 | |
| WO | 0076620 A1 | 12/2000 | |
| WO | 02085487 | 10/2002 | |
| WO | WO 03/039712 | 5/2003 | B01D 33/21 |
| WO | WO 03051487 | 6/2003 | B01D 33/23 |
| WO | WO 2004076026 | 9/2004 | B01D 33/23 |

OTHER PUBLICATIONS

PCT Written Opinion dated Oct. 10, 2008 for PCT International Application No. PCT/US08/08671.
Algas, Algas Thickener, Feb. 3, 2004, 4 pages, Moss, Norway.
Algas Fluid Technology Systems AS, Environmental Protection Made Profitable, Feb. 3, 2004, 4 pages, Moss Norway.
Algas, Raw Water Treatment, Feb. 3, 2004, 1 page.
Algas, More than NOK 2 Million Measures, Feb. 3, 2004, 1 page.
Envirex, Rex Microscreens, Bulletin No. 315-31, 1989, 8 pages, Waukesha, Wisconsin, USA.
Envirex, Rex Microscreens, Bulletin—Product Features and Benefits, 1989, 12 pages, Waukesha, Wisconsin USA.
Envirex, Rex Rotary Drum Vacuum Filters, at least as early as Aug. 1, 2005, 6 pages, Waukesha, Wisconsin USA.
GL&V Dorr-Oliver, The American Disc Filter, Bulletin 7202, 2000, 7 pages.
Hans Huber AG, Huber Technology, Rotafilt Cloth Filtration Plant, Aug. 1997, 5 pages, Germany.
Nordic Water Products AB, Efficient Filtration with DynaDisc Filter, at least as early as Aug. 1, 2005, 8 pages, Sweden.
PCT International Search Report dated Oct. 2, 2008 for PCT International Application No. PCT/US08/08673.
PCT Written Opinion dated Oct. 2, 2008 for PCT International Application No. PCT/US08/08673.
Material re: 1999 Hydrotech Installation at Anniston, AL Wastewater Treatment Plant, 5 Pages.
Material re: 2002 Hydrotech Installation (Filtertype HSF2110-2F; Serial No. 2931) at Casale Wastewater Treatment Plant, 9 Pages.
Material re: 2002 Hydrotech Installation (Filtertype HSF3112-2F; Serial Nos. 3013 et seq.) at Pero Wastewater Treatment Plant, 13 Pages.
Material re: Hydrotech Disc Filter (Filtertype HSF1702-1H; Serial No. 2351; 2000), 7 Pages.
Material re: Hydrotech Disc Filter (Filtertype HSF2108-1F; Serial No. 2455; 2001), 4 Pages.

* cited by examiner

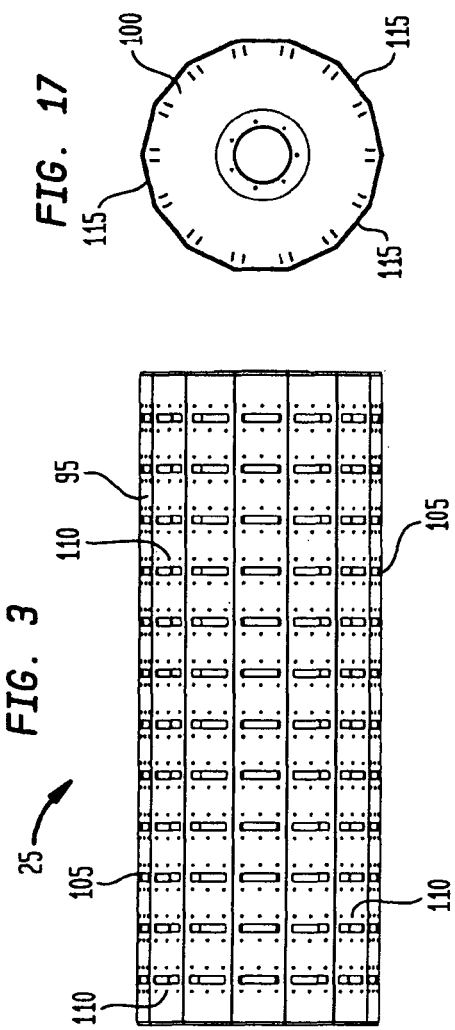
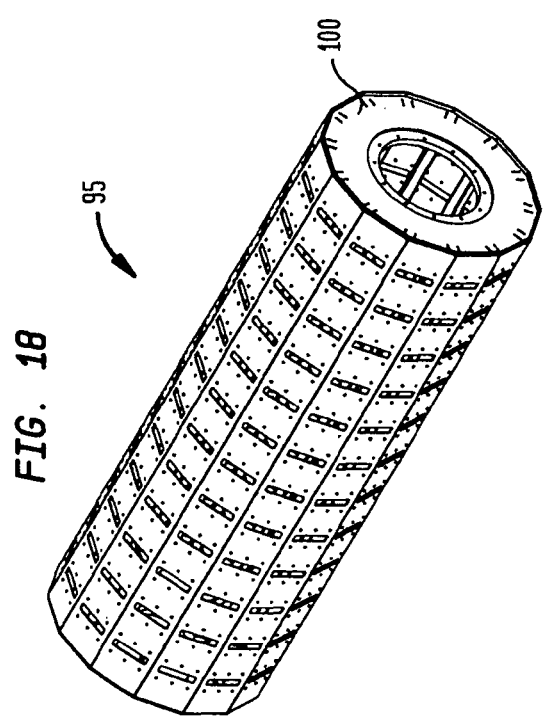
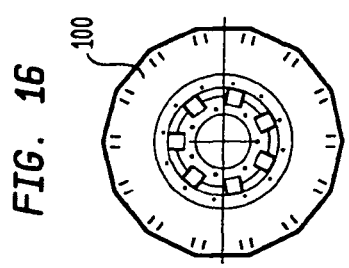

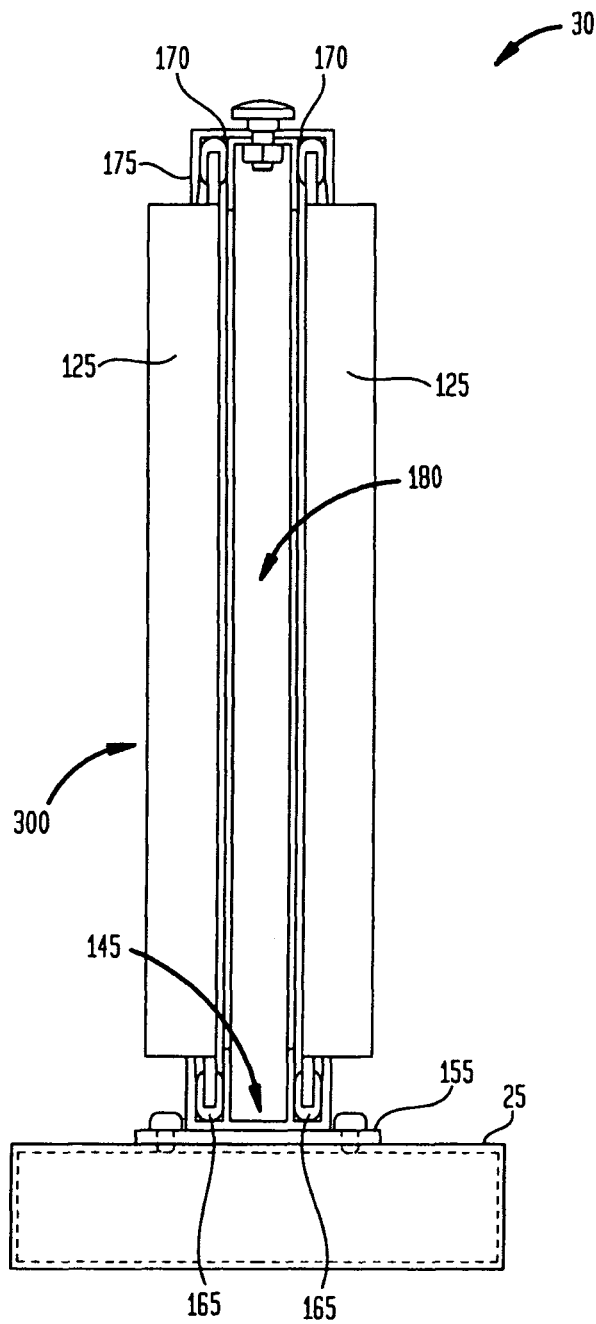

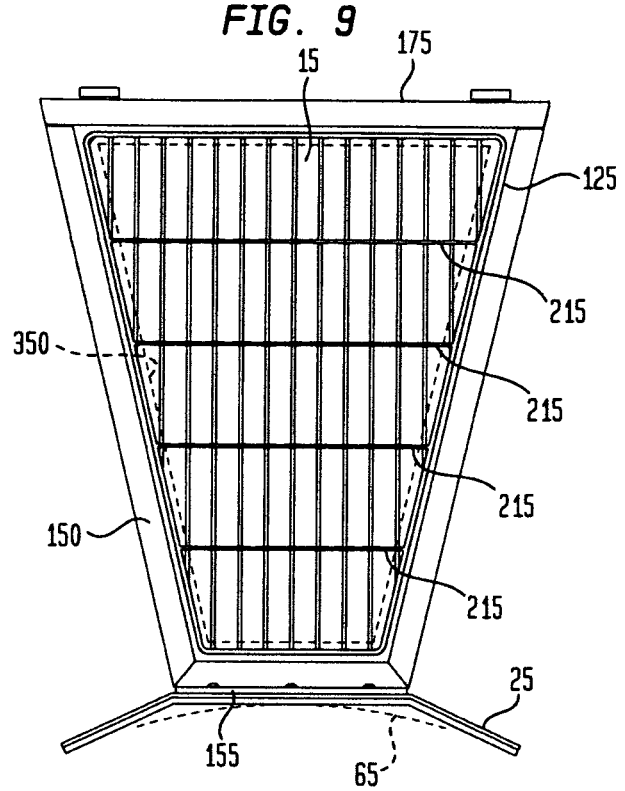
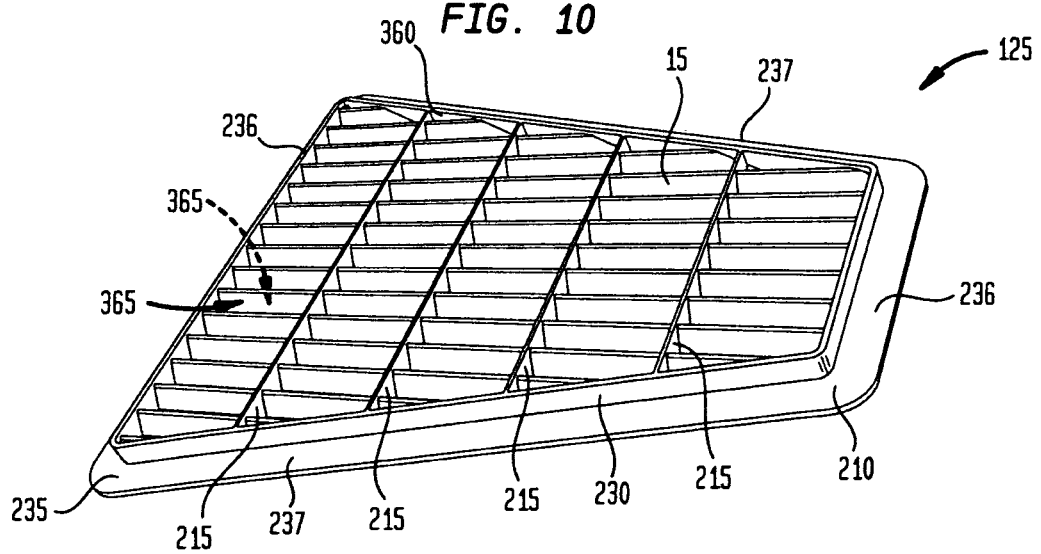

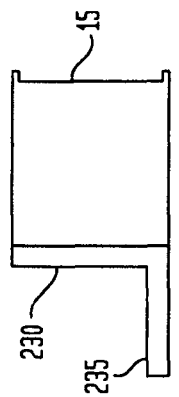
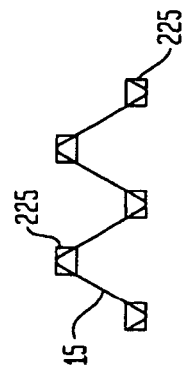
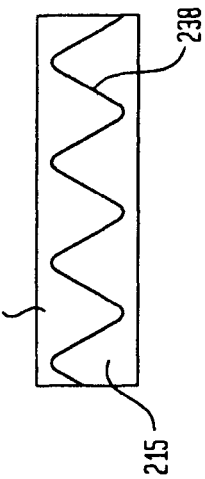
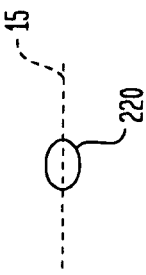
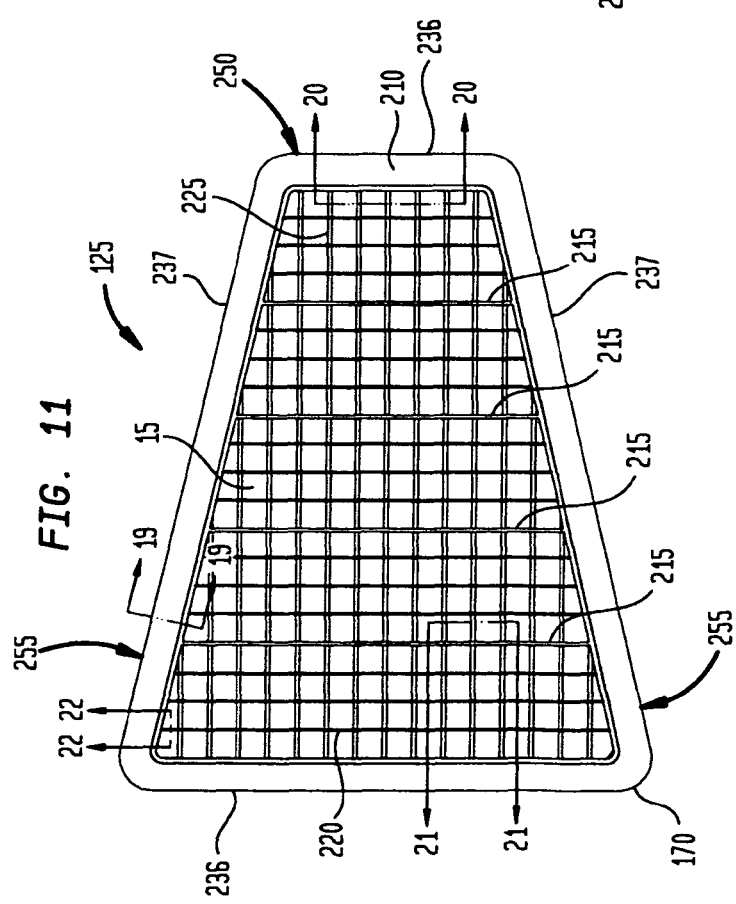

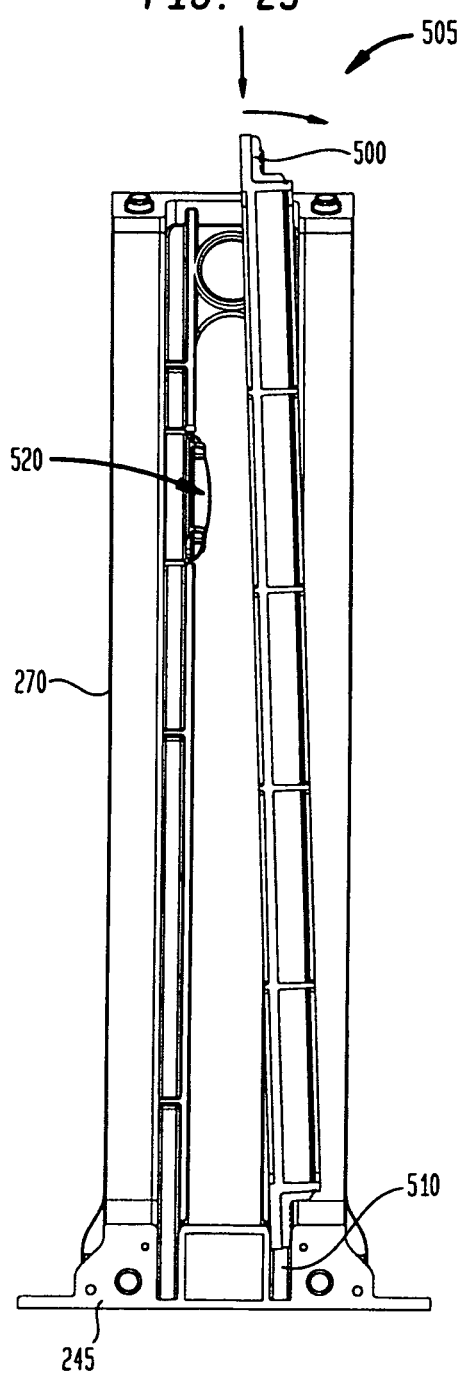
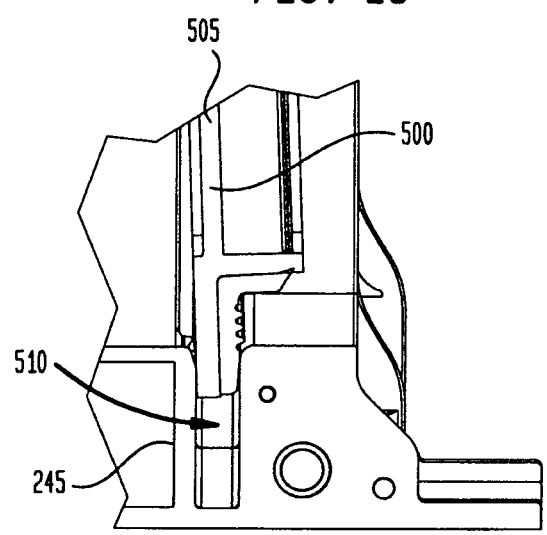

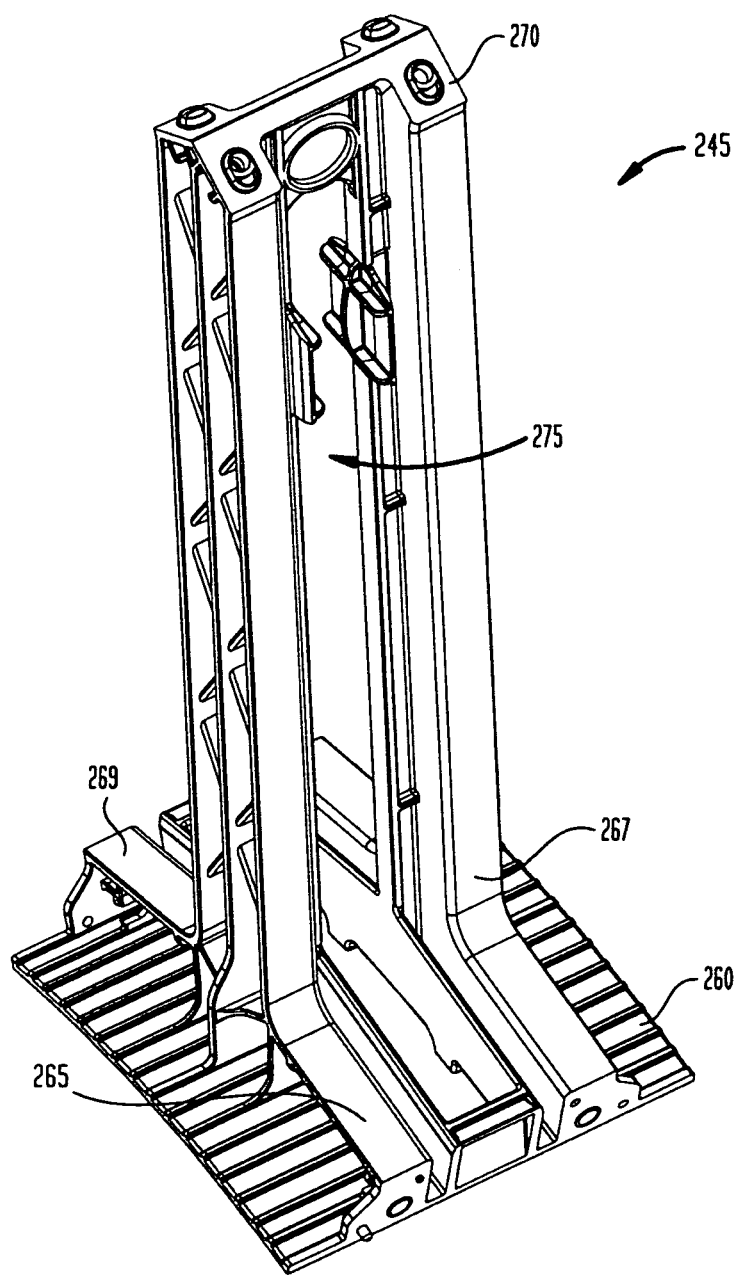

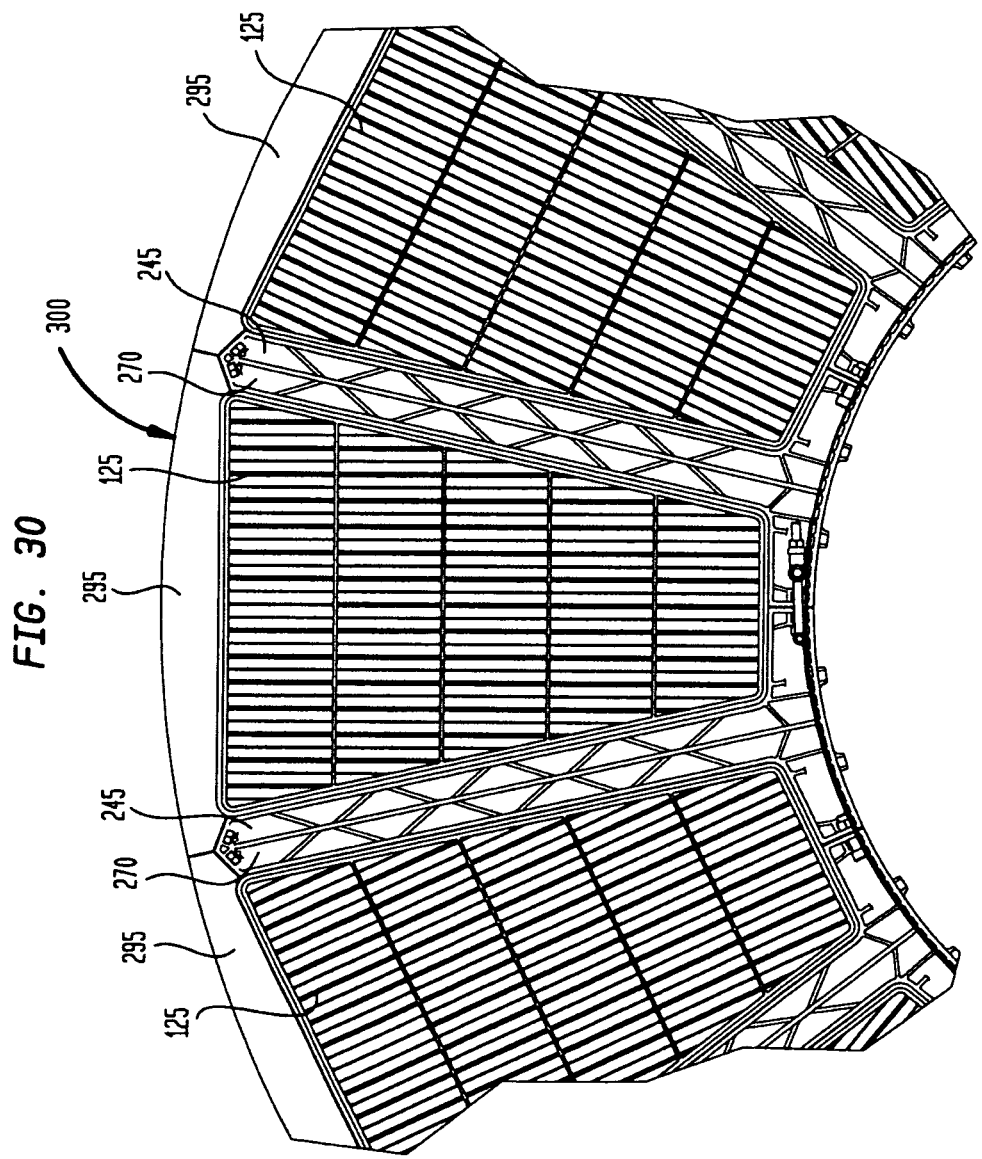

TRASH TOLERANT FILTER SUPPORT FOR A DISC FILTER

CROSS REFERENCE TO RELATED APPLICATION AND PRIORITY CLAIM

This invention claims the benefit under 35 U.S.C. Section 119(e) of U.S. Provisional Application No. 60/950,476 filed Jul. 18, 2007 entitled TRASH TOLERANT FILTER SUPPORT FOR A DISC FILTER and U.S. Provisional Application No. 60/950,484 filed Jul. 18, 2007 entitled ANTI-FOULING SUPPORT STRUCTURE FOR DISC FILTER which are hereby incorporated by reference in their entirety.

FIELD OF THE INVENTION

The invention relates to a disc filter used in a wastewater treatment plant, and more particularly, to a disc filter having a filter support configuration which enables unimpeded flow of air and water between pairs of filter panels of the disc filter.

BACKGROUND OF THE INVENTION

Large water filtration systems frequently include one or more stages of filtration that clean the influent (typically water) to a sufficient level to allow for the discharge of the influent into a natural body of water such as a lake or river. In regions where water is scarce, it may be desirable to further filter the water to allow for "reuse" of the water.

Many wastewater treatment plants utilize a disc filter system to filter water. Such systems typically include a plurality of discs each including a plurality of filter segments. Each filter segment includes a pair of filter panels which are spaced apart and arranged on an outer surface of the drum. A cap is attached to the top of each pair of filter panels to thus form a pocket shaped filter segment for receiving water. Each filter panel includes filter media, such as finely woven cloth for filtering water.

Each filter panel is attached to the drum by a filter support arrangement. Each filter support includes a plurality of support openings which provide fluid communication between adjacent filter segments. This enables water and air to flow circumferentially between adjacent filter segments as the drum rotates, thus resulting in an increase in capacity of the disc filter system.

In operation, the drum is rotated and the water to be filtered is introduced into the drum. The water then exits through ducts in the drum and flows into filter segments inside the filter support. The water in the filter support is then filtered through the media of the filter panels to provide filtered water. The filtered water is then collected in a chamber and exits the disc filter through an effluent pipe. Particulates which are filtered out by the filter panels remain within the filter segments on the inside surface of the filter media of the filter panels. A spray device is used to spray the panels with water to dislodge the particulates and clean the filter media. The particulates are then collected onto a trough and are removed from the disc filter system.

The drum ducts used in conventional systems are of sufficient size to allow large rags, weeds, algae, fibrous assemblages and other trash to pass through unimpeded. By way of example, the ducts may be approximately 4-8 square inches in area. By contrast, the total area of the support openings between filter segments is substantially smaller and may be in the range of approximately 1 square inch. During operation, trash is able to pass through the drum ducts but may not readily pass through the smaller support openings. As a result, trash accumulates at the support openings between filter segments which then causes the support openings to become either partially or completely blocked, thus impeding or stopping the flow of water between adjacent filter segments. This results in turbulent flow inside the filter segments, reducing the flow of particulates into the capture trough, thus increasing operating costs. Further, the support openings cannot be effectively reached and thus cleaned by current spray devices, necessitating frequent stoppages of the disc filter system to allow for manual cleaning of the system in order to maintain operating effectiveness. Therefore, it is desirable to provide a disc filter system in which the amount of trash collected at the support openings is substantially reduced.

SUMMARY OF THE INVENTION

The invention is directed to a filter device for filtering a liquid which includes trash. The device includes a drum for receiving the liquid and trash, wherein the drum includes at least one drum aperture. The device further includes a first pair of filter panels which are spaced apart to form a cavity for receiving the liquid and trash, wherein the filter panels are adapted for filtering the liquid.

The device further includes a frame for supporting the filter panels, wherein the frame is coupled to the drum and includes a frame aperture, wherein the frame aperture and cavity form a volume having a cross sectional area sized substantially equal to or greater than the drum aperture and wherein said volume extends to a second pair of filter panels to enable liquid and trash which pass through the drum aperture to also pass through the frame aperture to the second pair of filter panels.

BRIEF DESCRIPTION OF THE DRAWINGS

FIG. 3 is a side view of a drum of the disc filter of FIG. 1;

FIG. 4 is a broken away view of a portion of a disc of the disc filter of FIG. 1;

FIG. 9 is a front view of a filter panel in a support frame attached to the drum of the disc filter of FIG. 1;

FIG. 10 is a perspective view of the filter panel of FIG. 9;

FIG. 11 is a front view of the filter panel of FIG. 9;

FIG. 16 is an end view of the drum of FIG. 3;

FIG. 17 is another end view of the drum of FIG. 3;

FIG. 18 is a perspective view of the drum of FIG. 3;

FIG. 19 is a section view of a portion of the filter panel of FIG. 11 taken along line 19-19 of FIG. 11;

FIG. 20 is a section view of a portion of the filter panel of FIG. 11 taken along line 20-20 of FIG. 11;

FIG. 21 is a section view of a portion of the filter panel of FIG. 11 taken along line 21-21 of FIG. 11;

FIG. 22 is a section view of a portion of the filter panel of FIG. 11 taken along line 22-22 of FIG. 11;

FIG. 25 is a side view of a filter support framework during the installation of a gasketed filter element;

FIG. 26 is an enlarged side view of a portion of the filter support receiving the gasketed filter element;

FIG. 28 is a perspective view of a filter support;

FIG. 30 is side view of a disc including several filter panels and filter supports;

DETAILED DESCRIPTION OF THE INVENTION

Figure 1:
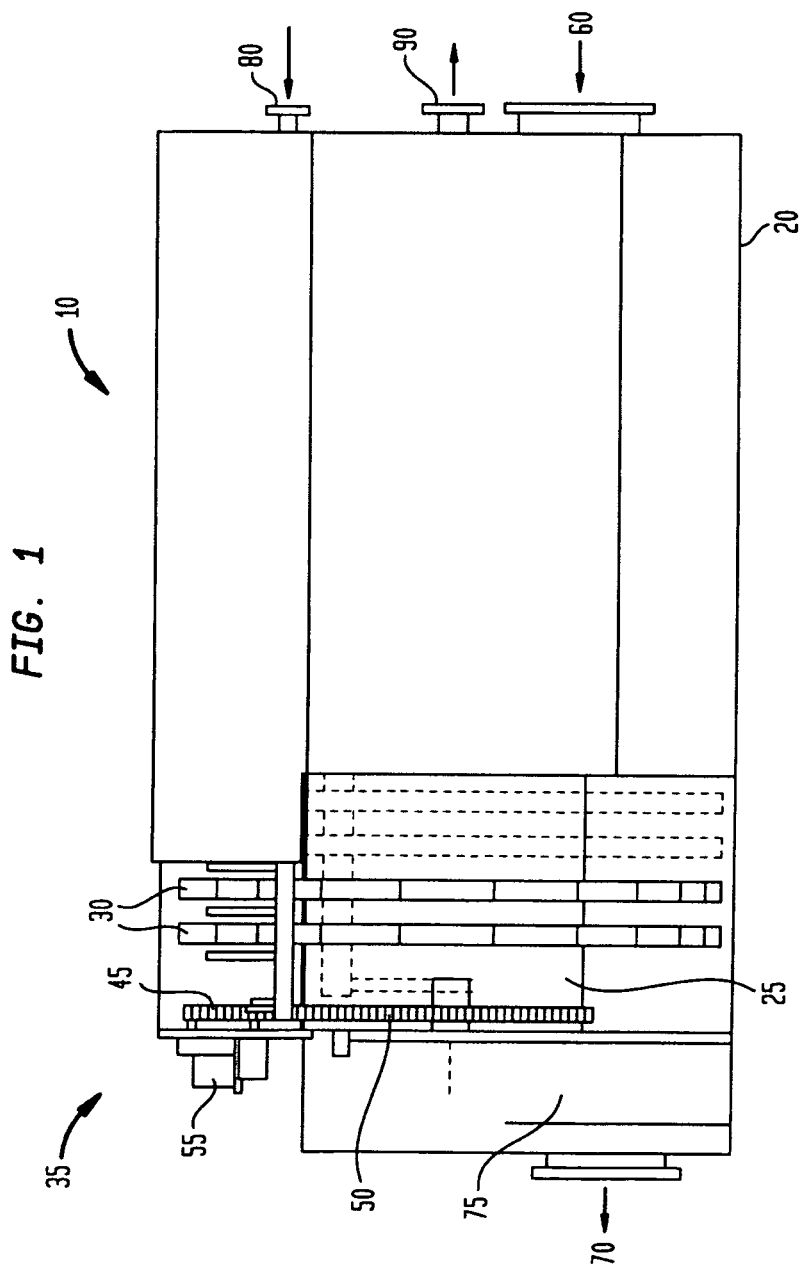
FIG. 1 is a partially broken away side view of a disc filter including a plurality of filter panels embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, the teachings of this invention apply not only to disc filters, but also may be adapted to drum type and other type filters that are used to filter high volume, high solids content fluids. The teachings apply not only to "inside-out" type filters using liquid head difference as a filtration driving force, but also apply to vacuum type filters, including "outside-in" type filters, and filters that operate in an enclosed vessel under pressure. Such type filters are exemplified and described in more detail in the brochures titled REX MICROSCREENS published by Envirex and dated August 1989, REX Rotary Drum Vacuum Filters published by Envirex, and REX MICROSCREENS Solids Removal For Lagoon Upgrading, Effluent Polishing, Combined Sewer Overflows, Water Treatment, Industrial Wastewater Treatment and Product Recovery published by Envirex in 1989 which are hereby incorporated herein by reference in their entirely. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

While the invention illustrated herein is described as being employed in a waste water treatment setting, and particularly as a tertiary treatment system, other uses and arrangements are possible. Other wastewater treatment applications include use as a primary or secondary clarifier in a municipal wastewater treatment plant as well as detrashing sludge.

In addition to wastewater treatment uses, the present invention can be used in pulp and paper applications. For example, the invention can be used for white water filtration, improving water quality after save-all filters, fiber recovery, raw water screening in the production of mechanically purified process water, prefiltration in conjunction with a sand filter in the production of chemically purified water, treatment of sealing water for pumps, recirculating the water in wood rooms, thickening pulp and paper stock, and/or replacing Vacuum filters, such as those commonly used in the pulp and paper industry (outside-in flow).

Still other applications include but are not limited to, dewatering coal, taconite processing, service water treatment, cooling water treatment, treating wastewater from galvanization processes, separation of tobacco particles from wastewater, and/or food industry wastewater filtration.

FIG. 1 illustrates a possible disc filter system configuration 10 employing pleated filter media 15. The media 15 may be woven or non-woven. In addition, pile cloth, needle felt, microfiltration, nanofiltration, reverse osmosis, or other membranes may be employed as media constructions. Preferred materials for use in making filter media include but are not limited to polyester, metal-coated polyester, antimicrobial-coated polyester, polypropylene, nylon, stainless steel wire, glass fiber, alumina fiber, glass filled polypropylene (17% preferred), glass-filled acetal, and/or glass-filled nylon.

It should be noted that the term "filter media" should be interpreted broadly to cover any component that filters a fluid. Other terms included within the definition of filter media include membrane, element, filter device, and the like. As such, the term "filter media" should not be narrowly interpreted to exclude any component that filters fluid.

Figure 2:
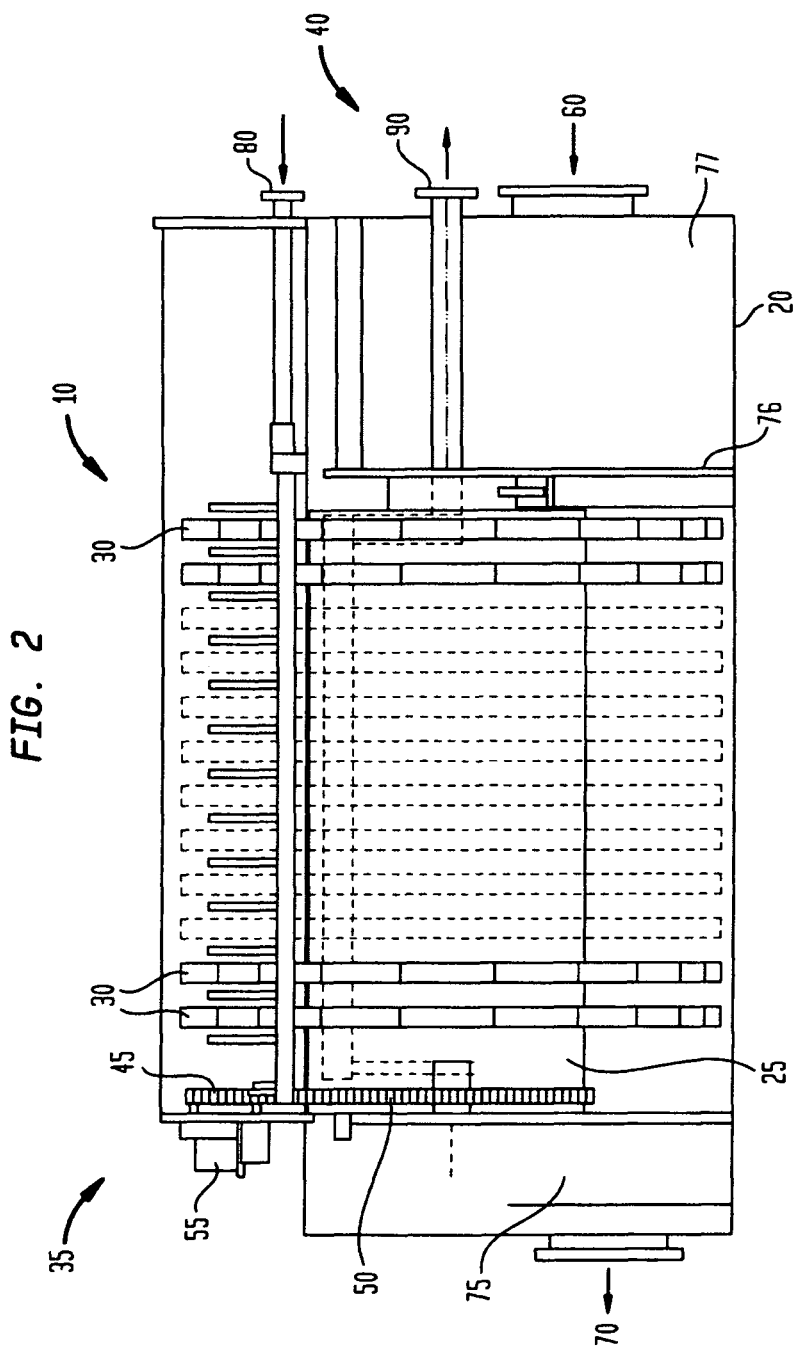
FIG. 2 is a broken away side view of the disc filter of FIG. 1.

Referring to FIGS. 1 and 2, disc filter 10 includes a housing 20, such as a metal tank that substantially encloses a drum 25, a plurality of discs 30, a drive system 35, and a flow system 40. It will be appreciated that variations on this design, including those employing a frame intended to facilitate mounting of the unit in a concrete tank, are also commonly used. The drive system 35 includes at least two bearings that support the drum 25 for rotation. A driven sprocket 50 is coupled to the drum 25 and a drive sprocket 45 is coupled to a motor 55 or other prime mover. In the illustrated construction, a belt engages the drive sprocket 45 and the driven sprocket 50 such that rotation of the motor 55 produces a corresponding rotation of the drum 25. In preferred constructions, the sprockets 45, 50 are sized to produce a significant speed reduction. However, some constructions may employ a slow speed drive with no speed reduction if desired. While the illustrated construction employs a belt drive, other constructions may employ gears, shafts, chains, direct drive, or other means for transferring the rotation of the motor 55 to the drum 25.

The flow system 40, better illustrated in FIG. 2, includes an influent pipe 60 that directs influent into an interior 65 (see FIG. 9) of the drum 25, an effluent pipe 70 that directs filtered fluid from a chamber 75 defined within the housing 20 out of the filter 10. A spray water pipe 80 provides high-pressure water to a spray system 85 (shown in FIGS. 5 and 13) that is periodically used to clean the filter media 15. A backwash pipe 90 transports the spray water after use and directs it out of the disc filter 10.

The disc filter 10 of FIGS. 1 and 2 employs a plurality of discs 30 to increase the overall filter area. The number and size of the discs 30 can be varied depending on the flow requirements of the system. For example, additional discs 30 can be attached to the drum 25 to increase the capacity of the filter system 10 without having to pass additional flow through any of the already existing discs 30.

FIGS. 3 and 16-18 illustrate a possible drum configuration 25 that is suitable for use with the invention. The illustrated drum 25 includes an outer surface 95 and two end surfaces 100 that cooperate to define the interior space 65. One end is open to permit flow and the other end is sealed against flow. Several drum apertures 105 are arranged in a series of axial rows with each row including a number of drum apertures 105 that extend circumferentially around a portion of the outer surface 95. The drum apertures 105 are rectangular although it is understood that other shapes may be suitable. Attachment apertures 110 are positioned on either side of each drum aperture 105. Each drum aperture 105 is associated with a set of attachment apertures 110.

As illustrated in FIGS. 3 and 16-18, the outer surface 95 of the drum 25 includes a number of flat planar surfaces 115 that contact one another to define a polygonal cross section. A circular cross section or a cylindrical or other shape could be employed in the invention if desired.

Figure 5:
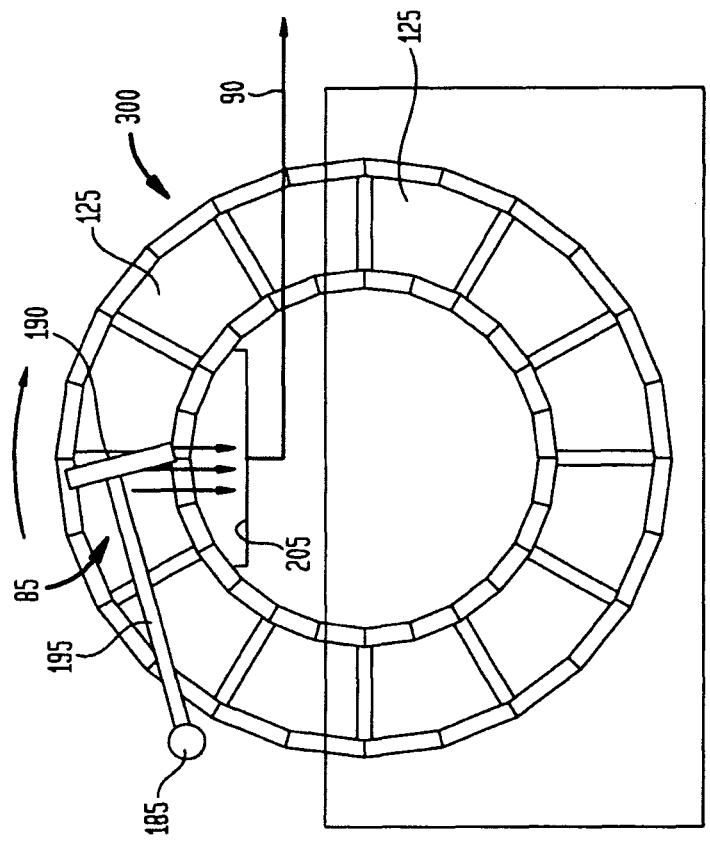
FIG. 5 is a front schematic view of a portion of the disc filter of FIG. 1.
Figure 7:
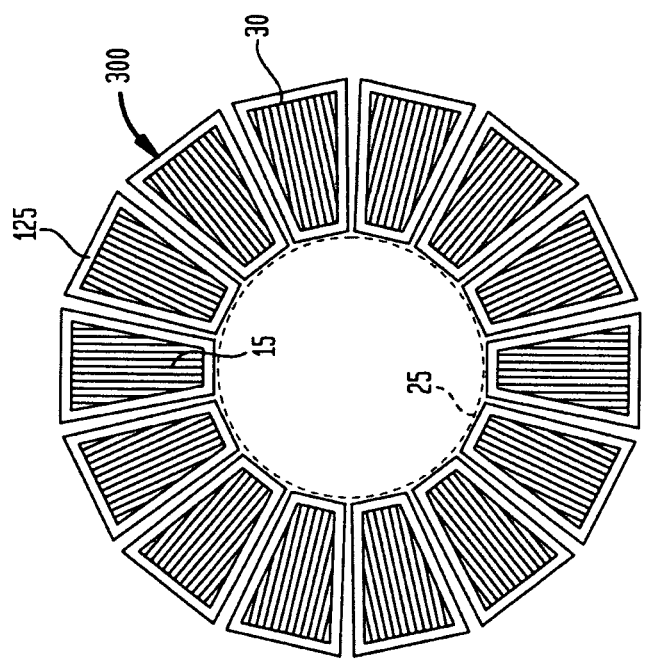
FIG. 7 is a schematic front view of a disc of the disc filter of FIG. 1.
Figure 8:
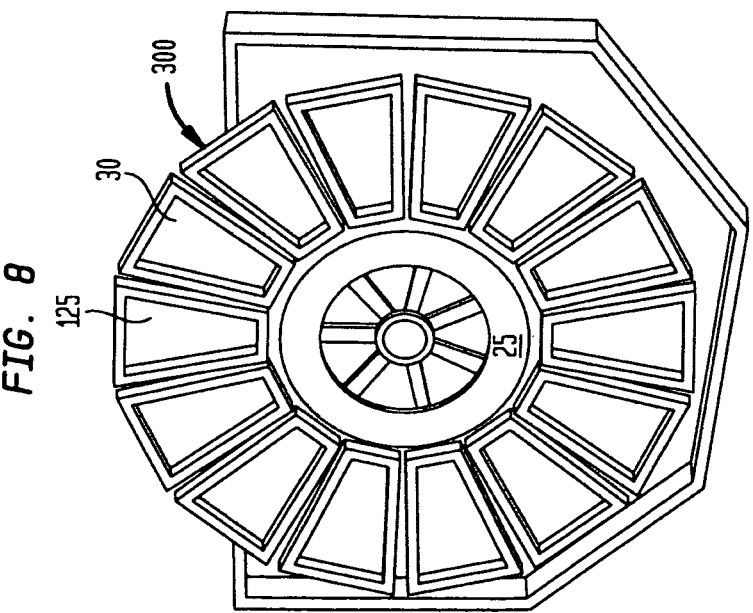
FIG. 8 is a perspective view of a disc of the disc filter of FIG. 1.

Referring to FIG. 5, a side view of one of the discs 30 of FIGS. 1 and 2 is shown. Each disc 30 includes a plurality of filter panel sets 300. Each filter panel set 300 includes two associated filter panels 125. In FIG. 5, one of the filter panels 125 from each panel set 300 is shown. The disc 30 in FIG. 5 depicts twelve filter panels 125 and thus disc 30 includes a total of twenty four filter panels 125. However, other constructions may employ more or fewer filter panels 125 as desired. For example, FIGS. 7 and 8 illustrate another arrangement in which twenty eight filter panels 125 are used (i.e. 14 filter panel sets). Referring to FIG. 4, one of the filter panel sets 300 is depicted. FIG. 4 is a side view of FIG. 9 with a right portion of a support structure 150 (see FIG. 9) removed. The filter panels 125 are mounted in the support structure 150 such that the filter panels are spaced apart from each other. An attachment plate 155 having an aperture 145 engages the attachment apertures 110 around a drum aperture 105 to attach the support structure 150 to the drum 25. A cap 175 is located over a top portion of the filter panels 125. The filter panels 125, the support structure 150 in which they are mounted, the cap 175, and the attachment plate 155 define a partially enclosed space 180. The partially enclosed space 180 extends circumferentially around the drum 25 through each filter panel set 300 on the disc 30. Fluid is able to pass from within the drum 25, through the drum aperture 105 and aperture 145 in the attachment plate 155 and into the enclosed space 180 to enable fluid to flow circumferentially within each filter panel set in the disc 30, as will be discussed below. A perimeter seal 165 is located on a perimeter 170 of each filter panel 125 (see FIGS. 10 and 11) and serve to inhibit leakage of water from around the filter panel 125.

Figure 6:
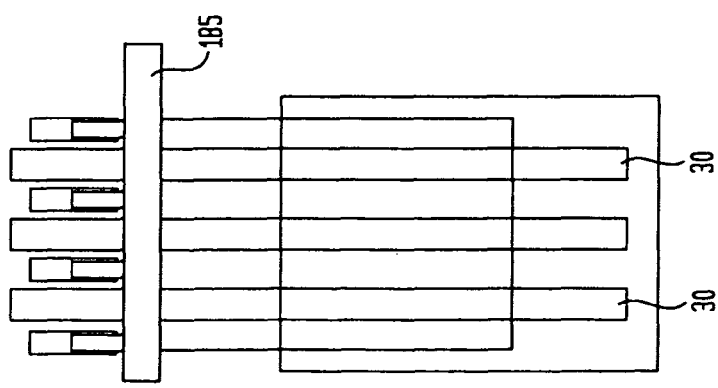
FIG. 6 is a side schematic view of a portion of the disc filter of FIG. 1.

Referring to FIG. 2 in conjunction with FIGS. 5 and 6, the spray water pipe 80 extends the full length of the disc filter 10 and defines a distribution manifold 185. A spray bar 190 is positioned between adjacent discs 30 (see FIG. 14) and at each end of the disc filter 10. A distribution pipe 195 extends between the manifold 185 and the spray bar 190 to provide for fluid communication of high-pressure water to the spray bar 190. The spray bar 190 includes nozzles 200 that spray water onto the filter panels 125 to periodically clean the filter panels 125 as will be described in greater detail with reference to FIGS. 13 and 14.

A trough 205 is positioned beneath the spray bar 190 between adjacent discs 30 to catch the spray water or backwash, including any particulate matter removed from the filter panels 125. The backwash and particles are then removed from the system 10 via the backwash pipe 90.

FIGS. 9 and 10 illustrate possible arrangements of the filter panels 125. FIG. 9 illustrates the panel 125 mounted in the support structure 150 (see also FIG. 4). FIG. 10 illustrates a pleated panel. The filter panels 125 include a pleated filter media 15, a perimeter frame 210, and several support gussets or stringers 215. In most constructions, the stringers 215 are molded as an integral part of the frame 210 with other attachment means also being suitable for use. In preferred constructions, the pleated filter media 15 is formed from a single piece of material that is sized and shaped to fit within the perimeter frame 210. In the illustrated constructions, the pleats extend in a substantially radial direction with other orientations also being possible. In one construction, a stainless steel screen is employed as the filter media 15. Other constructions may employ woven polyester, cloth, or other materials. The materials used and the size of the openings are chosen based on the likely contaminates in the effluent, the flow rate of the effluent, as well as other factors. In preferred constructions, the openings are between about 10 and 20 microns with smaller and larger openings also being possible.

The cap 175 is preferably formed from extruded aluminum with other materials (e.g., plastic, stainless steel, etc.) and other construction methods (e.g., injection molding, forging, casting, etc.) also being possible. In the illustrated construction, straight extruded portions are welded together to define the cap 175.

FIGS. 11 and 19-22 illustrates another arrangement of a filter panel 125 that includes a one-piece pleated filter media disposed within a frame 210. The construction of FIGS. 11 and 19-22 is similar to the construction of FIGS. 9 and 10 but also includes reinforced cross bracing 220 and peak stiffening members or ridge bars 225. In general, the ridge bars 225 and the stringers 215 cooperate to subdivide the filter media into a plurality of smaller cells. The cells are preferably sized as will be discussed below.

Before proceeding, it should be noted that stringers 215, cross braces 220, and ridge bars 225 are reinforcing members that aid in maintaining the pleated shape of the pleated filter media. It is understood that other reinforcing members or arrangements of the reinforcing members described herein which are suitable for maintaining the pleated shape of the filter media may also be used.

As illustrated in FIG. 19, one construction of the frame 210 is formed with a cross section of an angled member that includes a flow-parallel leg 230 and a flow-transverse leg 235 (see also FIG. 10). The flow-transverse leg 235 receives the respective inner diameter seal 165 as illustrated in FIG. 4, and provides additional stiffness to the flow-parallel legs 230. The flow-parallel legs 230 are sized to substantially match the peak-to-peak height of the pleated filter media 15. Referring back to FIG. 10, the frame 210 also includes two substantially parallel sides 236 and two non-parallel sides 237 that are arranged such that they are substantially radial with respect to the drum 25.

To further stiffen the filter media 15, a series of stringers 215 extend across the opening in the frame. The stringers 215 include saw tooth cuts 238, illustrated in FIG. 21 that fit within the pleats to aid in holding the pleated filter media 15 in the desired shape. The construction of FIGS. 9, 10 and 11 includes four stringers 215 although it is understood that three stringers 215 or other constructions may be used. In most constructions, the stringers 215 are molded as an integral part of frame 210 although other suitable attachment methods may also be used.

As illustrated in FIG. 21, the stringers 215 are generally located on both sides of the pleated filter media 15 such that the media 15 is sandwiched between two opposite stringers 215. This arrangement aids in holding the pleated filter media 15 in place during normal filtering operation as well as during backwashing.

As previously described, the construction of FIG. 11 includes additional peak stiffening members or ridge bars 225 that are coupled to the peaks and/or the valleys of the pleats. As illustrated in FIG. 20, plastic can be molded to the peaks and valleys to define the ridge bars 225 and further stiffen the media 15. Alternatively, metal wires or rods of metal, fiberglass-reinforced plastic, or other material of sufficient stiffness can be positioned to maintain the shape of the peaks and the valleys.

In still other constructions, reinforced cross bracing 220, such as that illustrated in FIG. 22 can be employed to further stiffen the pleated filter media 15. Again, molded plastic may be employed as cross bracing 220. Additionally, metal wire or bars may be welded, brazed, or otherwise attached to the pleated filter media 15 as cross bracing 220.

In still other constructions, two pleated filter media 15 pieces are positioned in a back to back relationship such that they provide support for one another.

Figure 15:
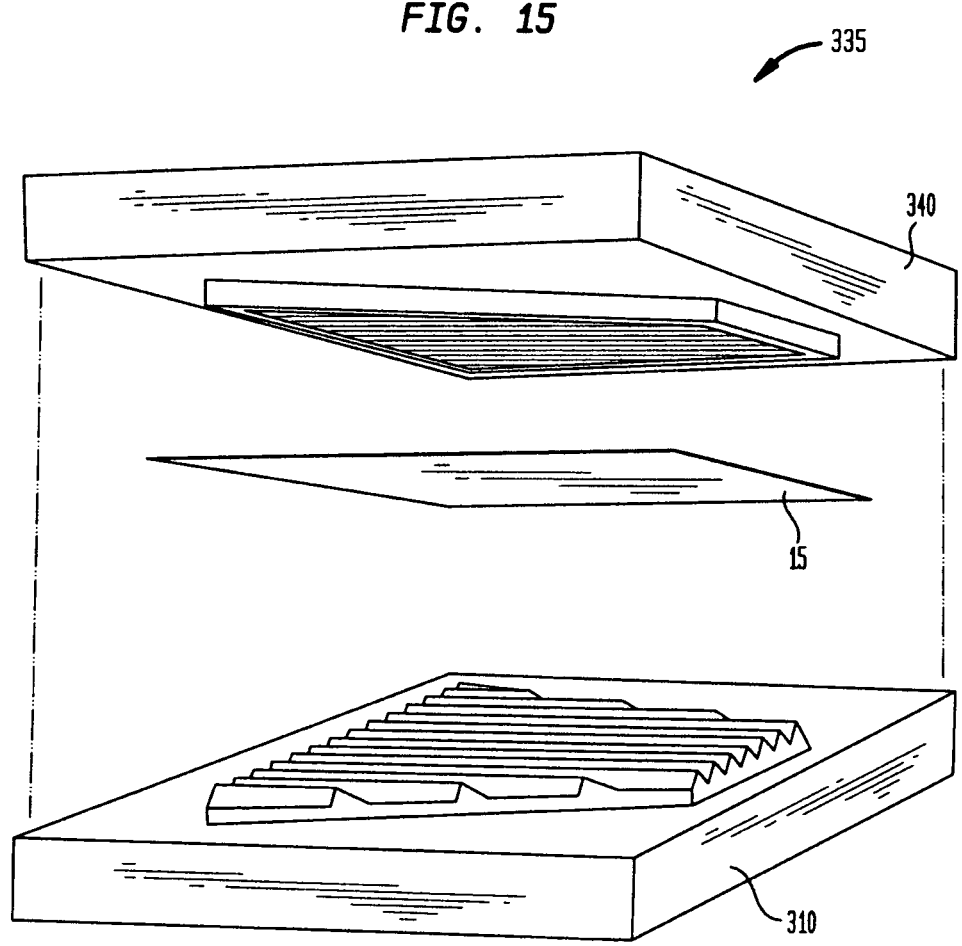
FIG. 15 is a perspective view of a mold configured to form a filter panel.

Referring to FIG. 15, another construction is shown. In this construction, the filter panels 125 are molded using a plastic material in conjunction with a filter media 15 or filter member. In this construction, a substantially planar sheet of the filter media 15 is placed in a mold 335. The mold 335 includes a first half 340 and a second half 310 that close over the filter media 15 and create the pleats in the media 15. A plastic material is then injected into the mold 335 to form the perimeter frame 210, the stringers 215, and the ridge bars 225. Thus, the perimeter frame 210, the stringers 215, and the ridge bars 225 are integrally formed as a single piece or component around the filter media 15. The edges of the filter media 15 are embedded in the perimeter frame 210, the ridge bars 225 are adjacent to or molded around the peaks and valleys of the pleats, and the stringers 215 are formed with saw tooths that engage the pleats. The pleats of the filter media 15 are sandwiched between the saw tooths of the stringers 215.

Figure 12:
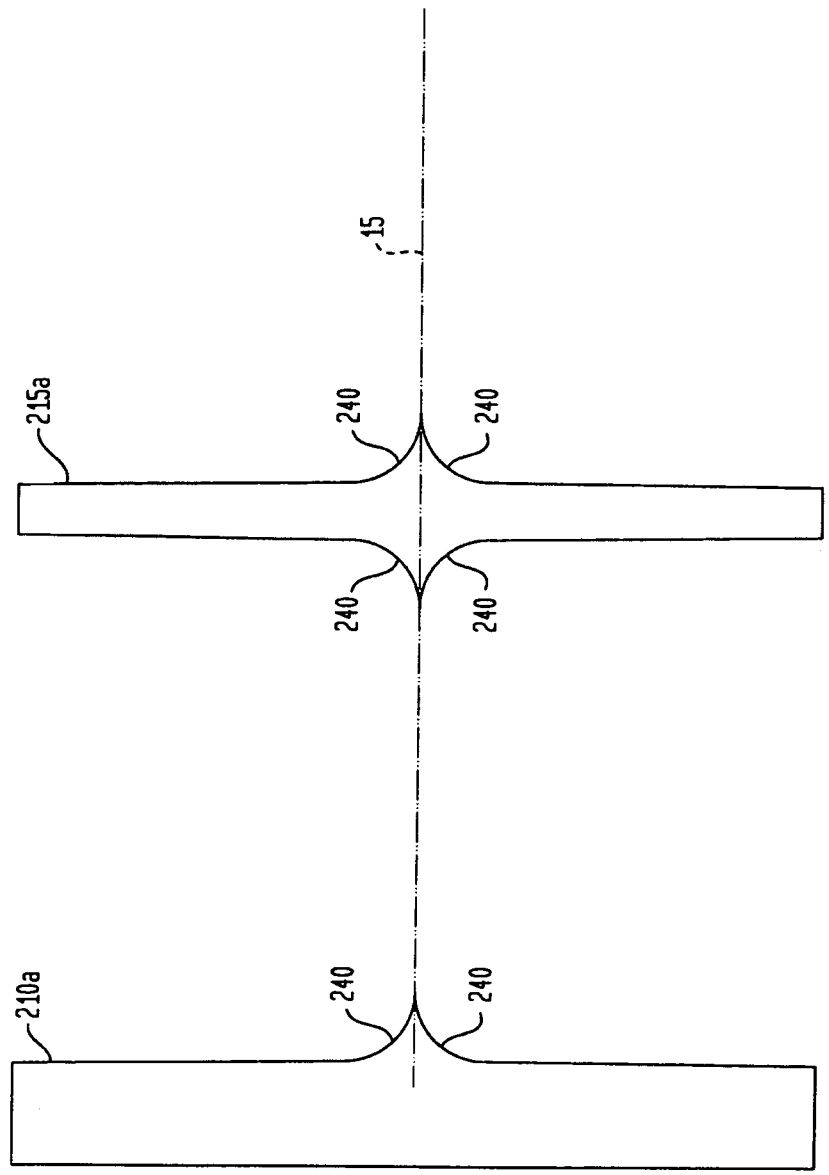
FIG. 12 is a schematic illustration of a feathered frame and a feathered stringer supporting a pleated filter media.

Referring to FIG. 12, feathering 240 may also be employed at some or all of the interfaces to reduce fatigue and improve the overall life of the pleated filter media 15. FIG. 12 illustrates a feathered frame 210*a* and a feathered stringer 215*a* adjacent the frame 210*a*. The feathering 240 provides additional surface area contact between the feathered component (e.g., frame, stringer, etc.) and the pleated filter media 15. Feathering 240 reduces the overall fatigue damage that may occur, and thus may extend the operational life of the pleated filter media 15.

Figure 13:
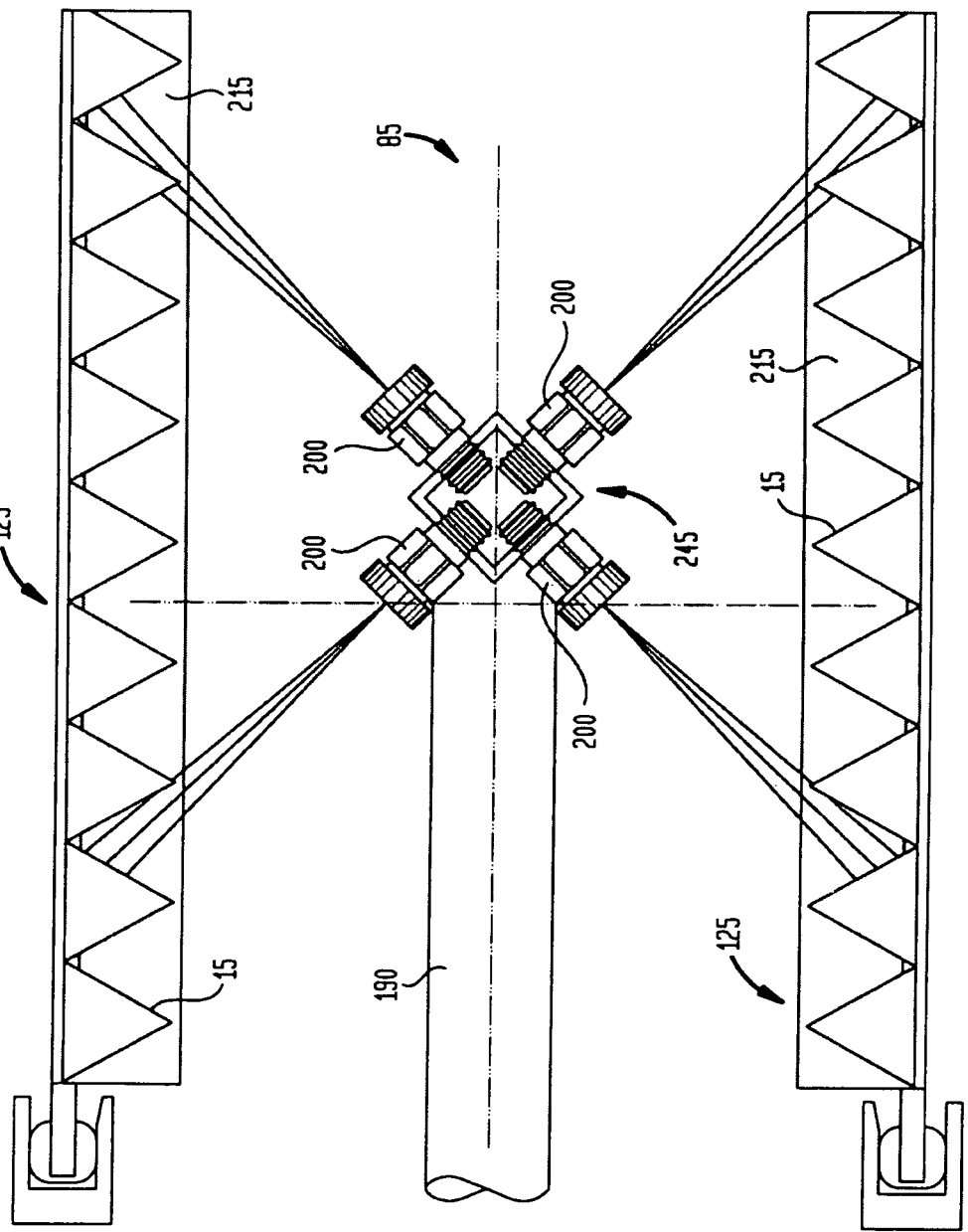
FIG. 13 is a schematic view of a backwash nozzle arrangement disposed between two adjacent discs of the disc filter of FIG. 1.

FIG. 13 illustrates a possible arrangement of nozzles 200 on a spray bar 190. As previously described, spray bars 190 are positioned between adjacent discs 30 and at the ends of the disc filter 10 to enable the spraying of high-pressure water in a reverse flow direction through the pleated filter media 15 to provide backwashing of the filter media 15. Because the filter media 15 is pleated and thus angled with respect to the plane of the discs 30, the use of nozzles 200 that are similarly angled provides for more efficient backwash cycles. Thus, the nozzles 200 are angled approximately 45 degrees off of a normal direction to the planes of the discs 30. In addition, two nozzles 200 are provided at each spray point 244 (see FIG. 14) with the nozzles 200 angled with respect to one another at about 90 degrees such that both sides of the pleats are sprayed directly during the backwashing. Surprisingly, a straight on direct spray may be utilized. In addition, bouncing spray off the filter media at an angle improves the cleaning effect and efficiency for a given amount of backwash flow and spray velocity.

Figure 14:
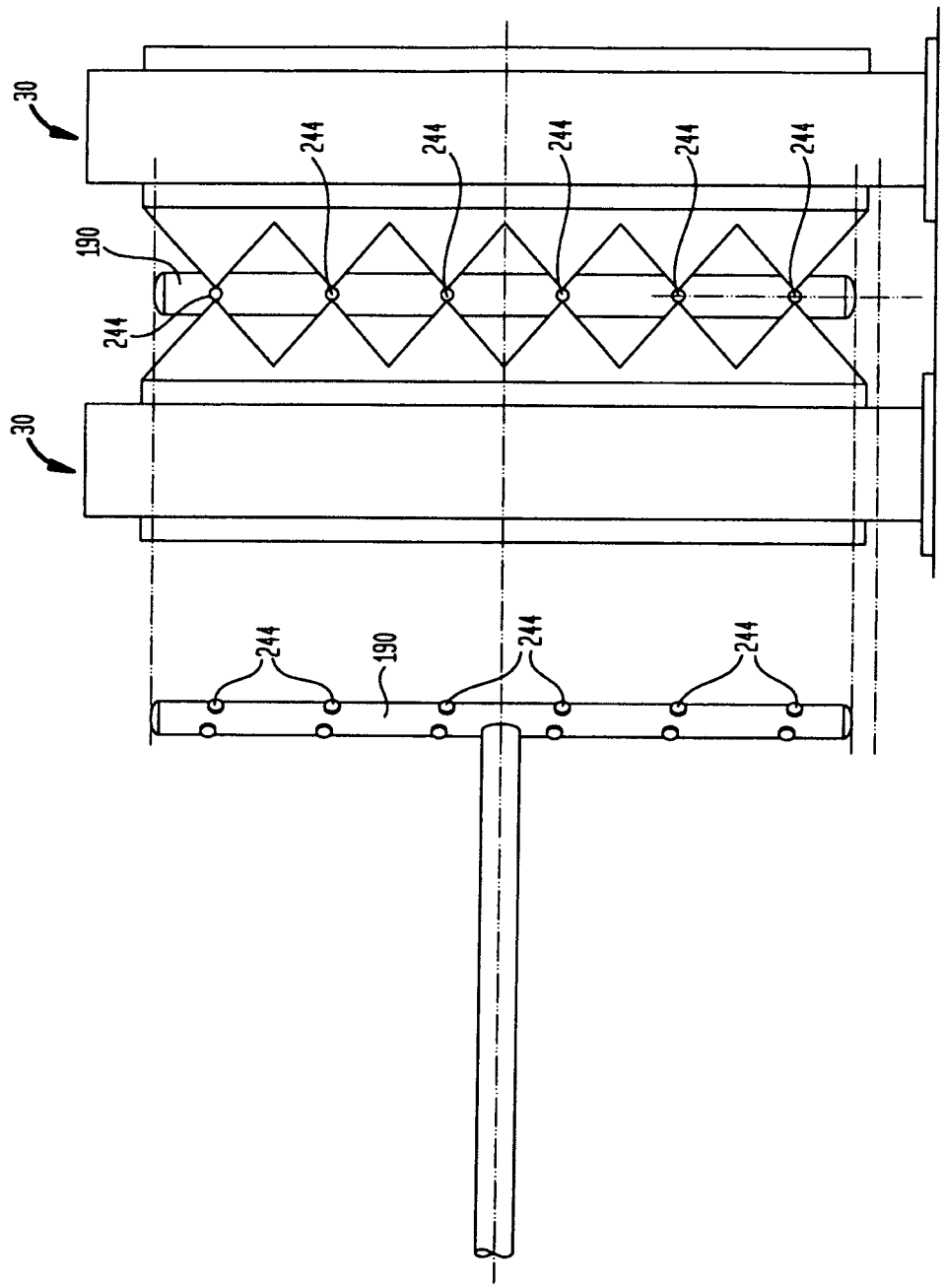
FIG. 14 is a side schematic view of the backwash spray bar arrangement of FIG. 13.

As illustrated in FIG. 14, each spray bar 190 may include multiple spray points 244 with four nozzles 200 supported at each spray point 244. In the construction illustrated in FIG. 14, six spray points 244 are employed with more or fewer points being possible. As the discs 30 rotate, the nozzles 200 direct high-pressure water onto the pleated filter media 15 and clean the filter media 15. It should be noted that the end-most spray bars 190 only require two nozzles 200 per spray point 244 as they are not disposed between two adjacent discs 30.

Referring to FIG. 28, a filter support 245 in accordance with the present invention is shown. The filter support serves to support a portion of a side 255 and bottom portion 250 of a pair of filter panels 125 (see FIG. 11). The filter support 245 includes an attachment portion 260 and a transversely oriented strut portion 270. The attachment portion 260 includes a first section 265 which extends from an end 267 of the strut portion 270. The attachment portion 260 also includes a second section 269 which extends from the end 267 in a direction opposite to the first section 265 to thus form an inverted T-shaped filter support 245. The attachment portion 260 further includes a single aperture 275 which extends along the first 265 and second 269 sections of the attachment portion 260 and along the strut portion 270 to thus form a substantially inverted T-shaped aperture which corresponds to the shape of the filter support 245.

Figure 29A:
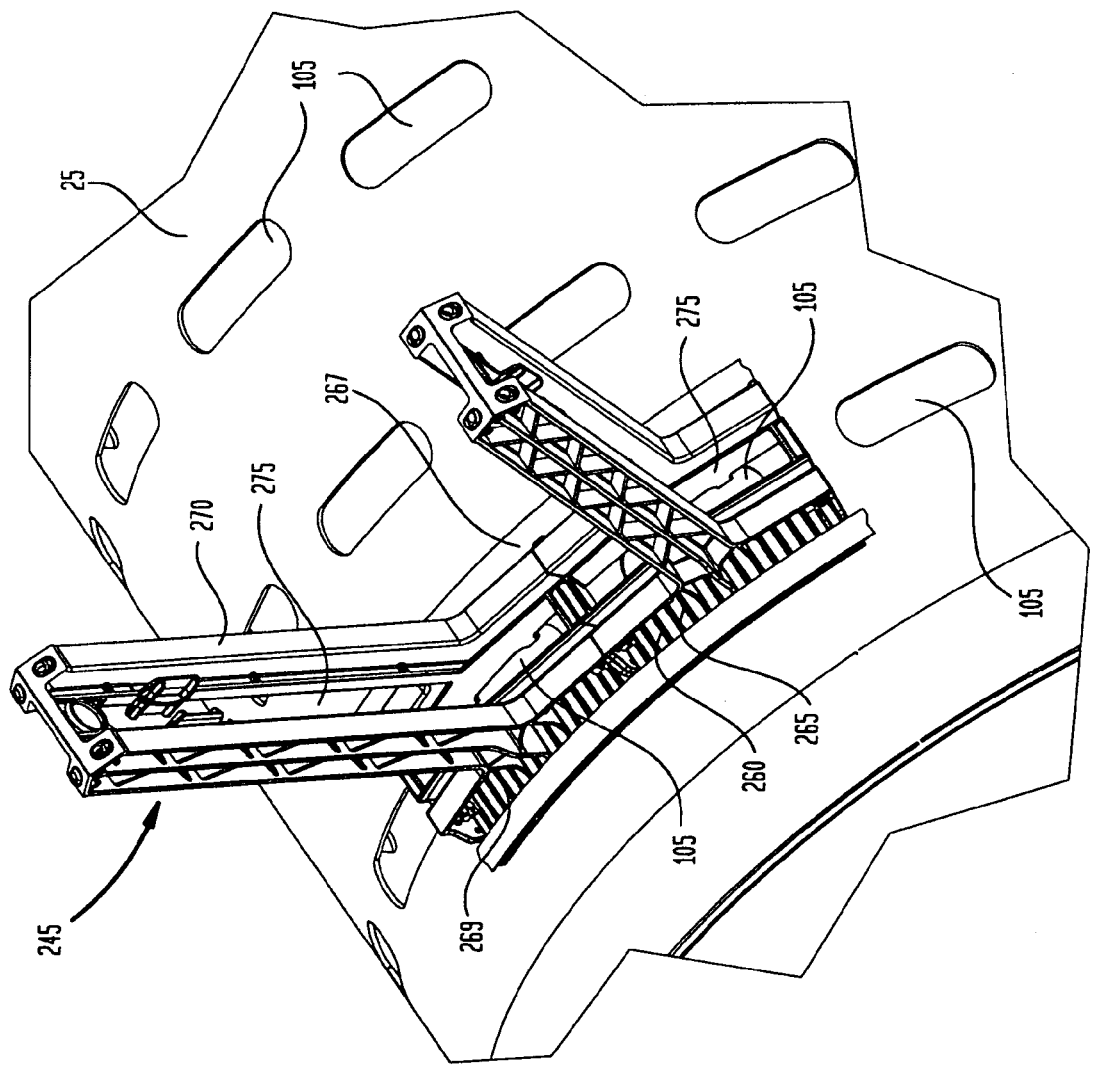
FIG. 29A is a perspective view of the filter support shown in FIG. 28 attached to a drum.

Referring to FIG. 29A, the filter support 245 is shown positioned on the drum 25. The attachment portion 260 is designed to be maintained in alignment with drum aperture 105 such that the aperture 275 is in fluid communication with an associated drum aperture 105 in the drum 25. The aperture 275 is substantially the same size or larger than the drum aperture 105. In another embodiment, the filter support 245 is positioned on the drum 25 such that the attachment portion 260 straddles a support section of the drum 25 located in between adjacent drum apertures 105. In this embodiment, portions of two adjacent drum apertures 105 are in fluid communication with the aperture 275.

Figure 29B:
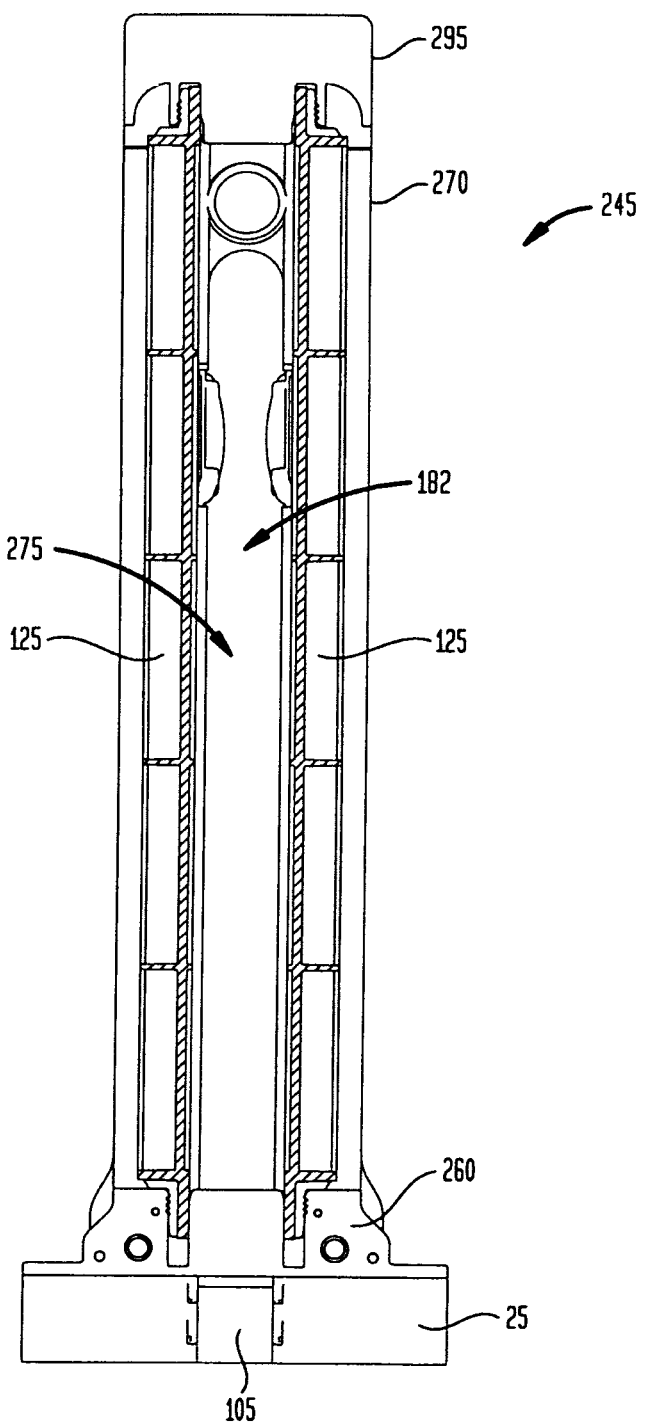
FIG. 29B is an end view of the filter support of FIG. 28 attached to a drum.

Referring to FIG. 29B, a pair of filter panels 125 is shown installed in the filter support 245. The filter panels 125 are spaced apart from each other. Referring to FIG. 30 in conjunction with FIG. 33, a side view of a plurality of filter supports 245 and filter panels 125 is shown. A cap 295 is used to secure each pair of filter panels 125. Each cap 295 is removably secured to adjacent radial struts 270 to enable removal of each filter panel 125 for cleaning or replacement as necessary. Each filter panel pair, filter support 245 and associated cap 295 form a filter panel set 300 for receiving contaminated water. Further, the filter panels 125, cap 295 and aperture 275 form a volume 182 whose cross sectional area is equal to or larger than the area of drum aperture 105. Volume 182 extends circumferentially around the drum 25 through each filter panel set 300 on the disc 30 and is continuous. Referring to FIGS. 30, 29A, 29B, and 30 in conjunction with FIG. 33, the aperture 275 enables fluid communication between the drum aperture 105 and adjacent filter panel sets 300. This enables water and air to flow circumferentially between adjacent filter panel sets 300 as the drum 25 rotates, thus resulting in an increase in capacity of the disc filter 10.

Water to be filtered enters a filter panel set 300 through the drum aperture 105 and the aperture 275. The water in the filter panel set 300 is then filtered through the filter panels 125 to provide filtered water. The aperture 275 is of sufficient size relative to the drum aperture 105 such that trash or other debris which flows through the drum aperture 105 is not captured by the radial strut 270. In one embodiment, the aperture 275 is substantially equal in size to the drum aperture 105. In another embodiment, the aperture 275 is sized larger than the drum aperture 105. As a result, the amount of trash collected by the radial strut 270 is substantially reduced or eliminated, resulting in relatively unimpeded flow of water and air between filter panel sets 300 as the drum 25 rotates. This design feature minimizes water turbulence from water inertia and prevents air entrapment and subsequent release so that the undesirable wash off of solids already filtered from the water is substantially reduced. The radial strut 270 further includes ribs 305 which provide structural support.

Figure 31:
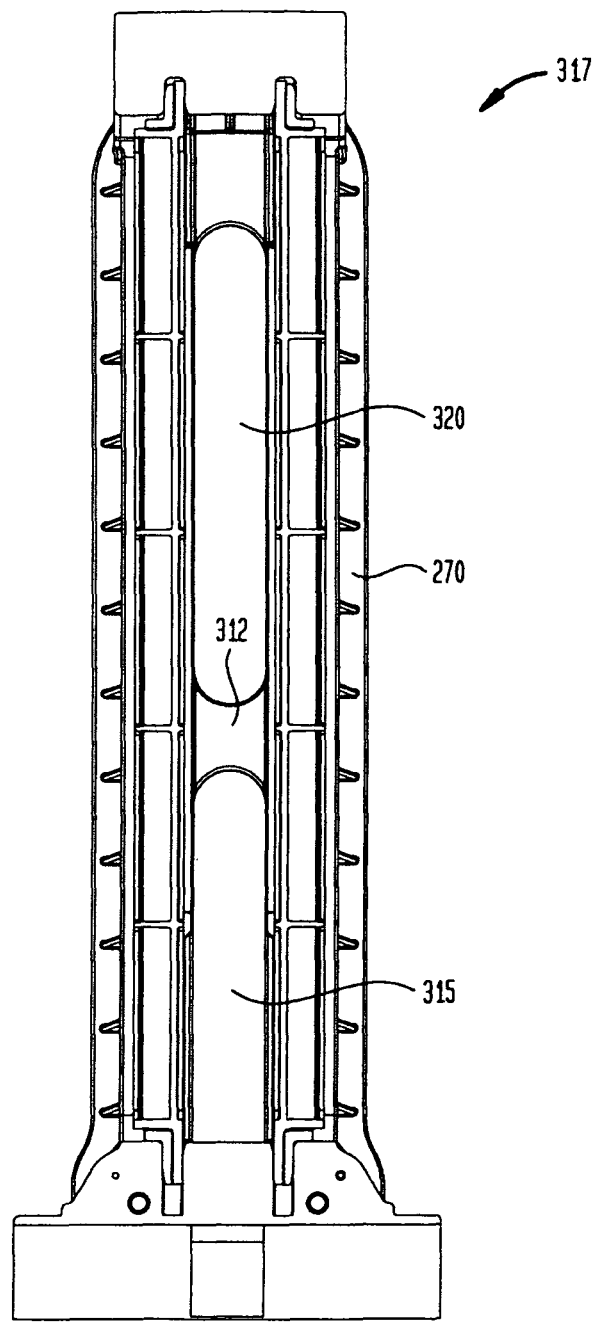
FIG. 31 is an end view of another filter support attached to a drum.

Referring to FIG. 31, a filter support 317 is shown wherein the radial strut 270 includes a gusset 312 which provides additional structural support. The filter support 317 includes first 315 and second 320 fluid channels whose total area is substantially equal in size to the drum aperture 105. This results in the elimination or reduction in the amount of trash that is collected by the radial strut 270 as described above. Filter support 317 results in a larger fluid channel area relative to that of conventional filter supports. This reduces the amount of material necessary to manufacture filter supports 317, thereby resulting in reduced manufacturing costs. It has been determined through calculation that the structural integrity of the embodiments shown herein are acceptable when designing for a head loss of as much as 24 inches of water or even higher.

As previously described, the disc filter 10 may use filter panels 125 which are pleated, although it is understood that other types of panels may be used. An advantage with using pleated filter media 15 is that both the media pleats themselves, as well as the panel perimeter sidewalls such as those along the radial sides of the pleated panel 125, provide temporarily horizontal surfaces to which trash can cling more readily. As a result, rotating shelves are formed while submerged which are oriented at a favorable angle with respect to gravity until the trash is over the trough for eventual deposit thereon.

Figure 32:
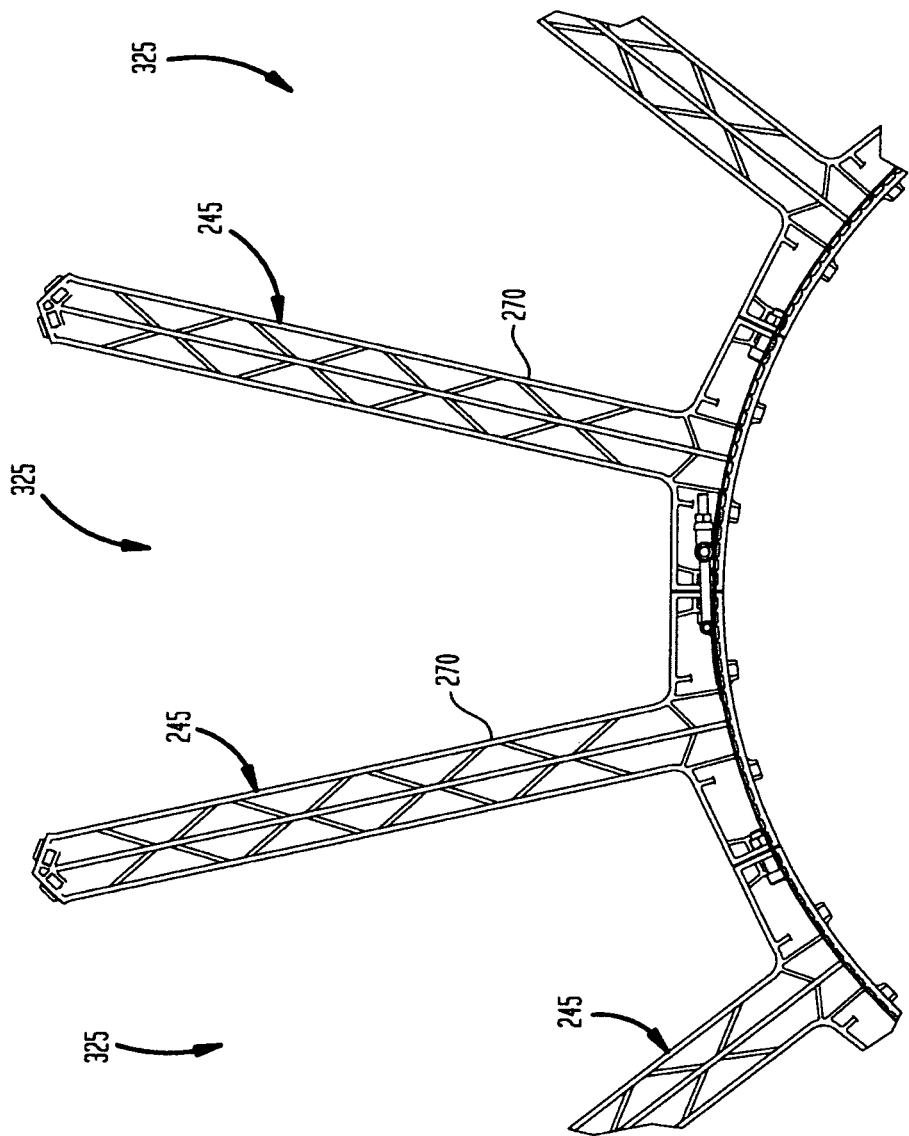
FIG. 32 is an end view of several filter supports attached to one another.
Figure 33:
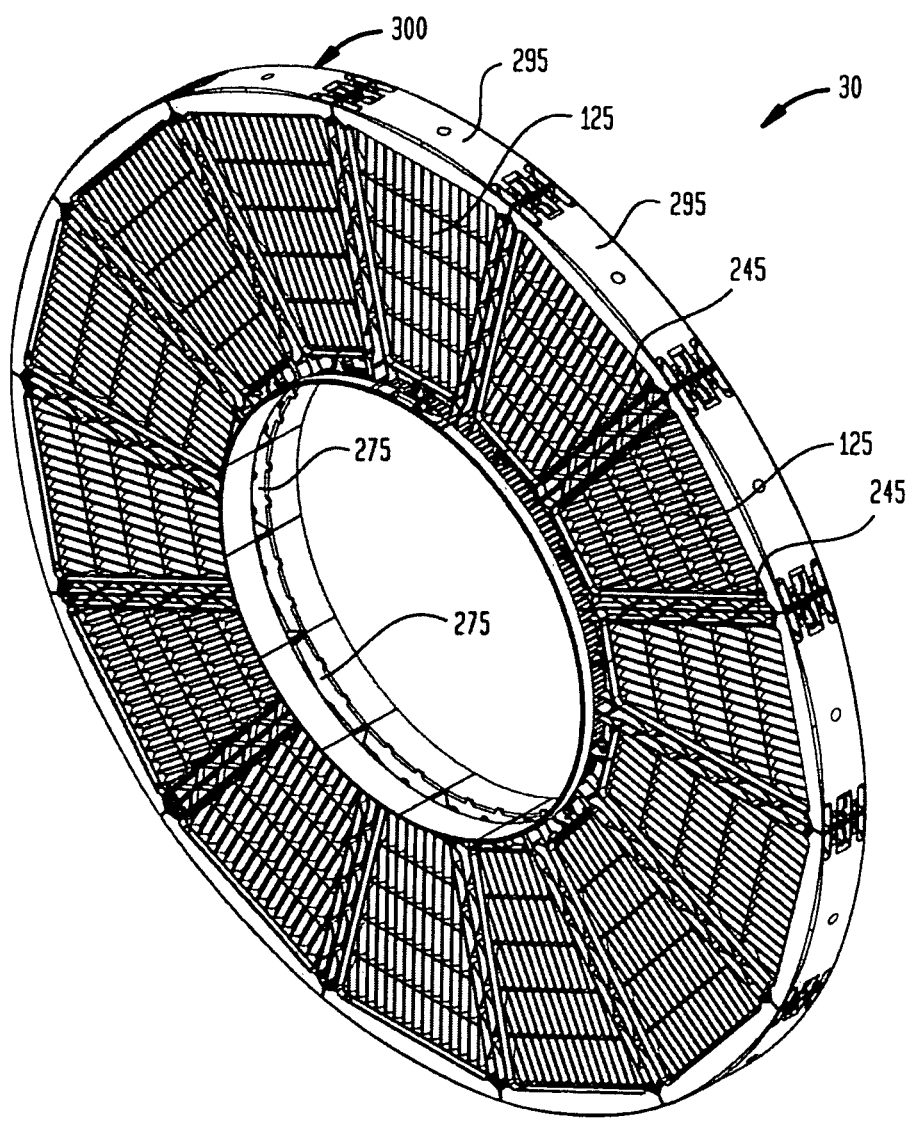
FIG. 33 is a perspective view of a disc including a number of filter panels.

Referring to FIG. 32, a plurality of filter supports 245 is shown assembled. The radial struts 270 extend outwardly from the drum 25 and are spaced apart from each other to form spaces 325 each of which is adapted to receive a filter panel 125. Referring to FIG. 33, a view of the disc 30 is shown depicting filter supports 245, filter panels 125 and caps 295 in accordance with the present invention. In this configuration, the disc includes fourteen filter panels sets 300 (twenty eight filter panels 125 total).

In prior designs, seating of the panels is a two-step process. First, the filter panel with edge seal is slid down into the edge channels of a filter support. Then the cap is slid into place against the top edge gasket. During the both steps, sliding friction develops between the channel walls and the gasket. During the first step, the maximum panel seating force required can rise to a very large value unless a design compromise is made. Along the angled sides 255 of the trapezoidal panel, the friction force direction is opposite to the gasket insertion path, but is at a significantly oblique angle to the long direction of the gasket. Hence, the risk of sideways stretching or potentially distorting movement of the gasket relative to its original position and shape is high. Such distortion may result in leakage. In particular, the gasket can seal against higher pressure if under a higher compression force, but high compression force raises the risk of leakage due to distortion or stretching of the gasket during insertion into the angled side channels of a conventional design.

The friction associated with gasket sliding in a filter support structure design having sidewall channels demands a compromise between reasonable insertion force and adequate compression of the gasket. Lower gasket compression results in lower sliding friction, but also reduces the pressure threshold for leakage. Conventional systems attempt to overcome this problem by "flocking" the outside sliding surfaces of the rubber gasket. While this helps, it does not eliminate the inherent problem.

In a preferred embodiment, a bottom channel is used. Since the bottom channel is relatively short the insertion force remains very low, even for reasonably high gasket compression. The likelihood of sideways stretching or potentially-distorting movement of the gasket due to oblique friction forces is substantially reduced for a bottom channel.

Figure 24:
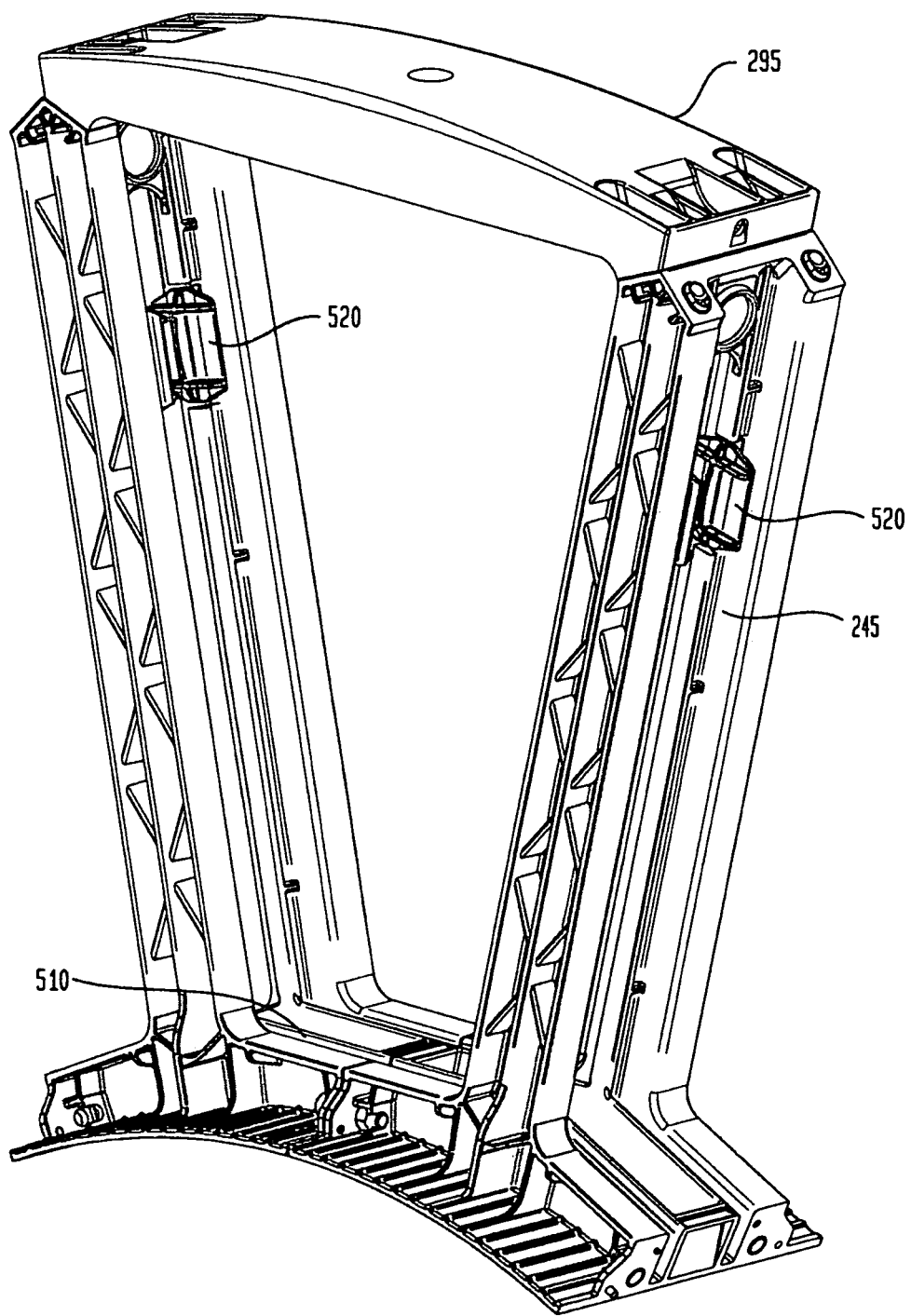
FIG. 24 is a perspective view of components that form a filter support framework.

To assemble a filter panel 125, a molded gasket 500 that is slightly undersized is stretched around the outside of the filter panel 125 to create a gasketed panel 505 as illustrated in FIGS. 25 and 26. The tension on the gasket 500 serves to hold the gasket 500 in position. However, some constructions may employ a sealing/retention aid such as silicone rubber or silicone grease. The bottom of the gasketed panel 505 is then inserted into a filter panel receiving space such as a slot or bottom channel 510 of the filter support 245 (shown in FIG. 24) and is pushed downward. The top of the gasketed panel 505 is then pushed forward (tilted) to lock the panel 125 in place.

Figure 27:
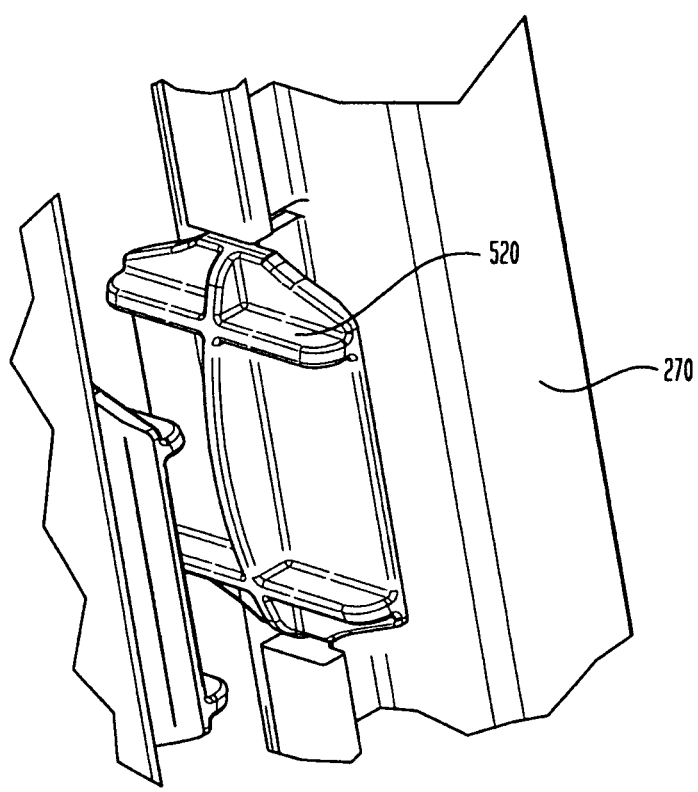
FIG. 27 is a perspective view of a snap lock feature.

In one embodiment, the filter support 245 includes a snap lock feature 520 (shown in FIG. 27) located about one quarter of the way from the top of the filter support 245. More specifically, the snap lock feature 520 is on the radial strut 270 of the filter support 245. Each snap lock feature 520 holds two adjacent filter panels 505. The snap lock feature 520 is flexible, and is pushed out of the way as the panel 505 is tilted into place. It then snaps back to its original position, locking the panel 505 into the upright position. In this position (the operating position) a seal is formed completely around the perimeter of the filter panel 505 between the filter panel 505 and the panel support structure, which includes the filter support 245 and the cap 295.

To complete the installation of the gasketed panels 505, the cap 295 is positioned on top of the filter support structure and cap hardware is installed. In preferred constructions, the cap hardware includes a nut and a bolt that connect the cap 295 to the adjacent cap 295. Each end of the cap 295 is connected to the adjacent cap 295 to define a complete ring of caps 295 around the outer perimeter of the disc 30.

In operation, water enters the disc filter 10 via the influent pipe 60. The contaminated influent water is separated from the clean filtered water using a wall 76 through which the drum is mounted with a rotating seal. The wall 76 forms an influent water chamber 77 and a filtrate water chamber 75. The influent enters the drum interior 65 and exits through drum apertures 105 in the drum 25 and flows into volume 182 as previously described. The water in volume 182 is then filtered through the pleated filter media 15 in at least one of the filter panels 125 and flows out ("inside out flow") to provide filtered water. As the influent passes through the pleated filter media 15, particulates that are larger than the openings in the filter media 15 are retained within volume 182 and remain on an inside surface of the filter media 15. The effluent collects within the filtrate water chamber 75 outside of the discs 30 and exits the disc filter 10 via the effluent pipe 70. A system of weirs defines the effluent end of filtrate water chamber 75 and maintains the desired minimum liquid level in chamber 75 within the filter 10.

During operation, the drum 25 continuously or intermittently rotates such that filter panels 125 enter the liquid and filter influent only during a portion of the rotation. As previously described in relation to FIGS. 28, 29A, 29B and 30, the aperture 275 enables fluid communication between the drum aperture 105 and adjacent filter panel sets 300. This enables water and air to flow circumferentially between adjacent filter panel sets 300 as the drum 25 rotates. As a result, the amount of trash collected by the radial strut 270 is substantially reduced or eliminated, resulting in relatively unimpeded flow of water and air between filter panel sets 300 as the drum 25 rotates. This design feature minimizes water turbulence from water inertia and prevents air entrapment and subsequent release so that the undesirable wash off of solids already filtered from the water is substantially reduced.

Since discs 30 are never fully submerged, filter panels 125 enter the liquid and are available for filtering influent only during the bottom portion of the rotation arc. After filtering, and during rotation of drum 25, the filter panels 125 exit the liquid and pass the spray bars 190. During a backwash cycle, the spray device 85 is used to spray the filter panels 125 with high-pressure water or chemicals to dislodge the particulates and clean the filter media 15 as the drum 25 rotates. The water droplet impact vibration and penetration of the filter media 15 by a portion of the water removes debris that is caught on the upstream surface of the pleated filter media 15. The debris and water are collected in the trough 205 and transported out of the filter system 10 by pipe 90. During backwashing, filtration can continue as some of the filter panels 125 are disposed within the liquid, while others are above the liquid and can be backwashed The filter panels 125 described herein provide for a greater flow area than prior art systems and are capable of operating at a substantially higher flow through a similar panel area. Specifically, the perimeter frame 210 defines a panel normal flow area 350, shown in FIG. 9 that is essentially the planar area within the perimeter frame 210. As one of ordinary skill will realize, the true flow area is less than this planar area as support members may extend across this area and block some of the flow area. However, this area is minimal and generally can be ignored. By forming pleats in the filter media, the flow area is greatly increased as the fluid (e.g., air, water) flows generally through the pleats in a direction 355 normal to the pleat, as illustrated in FIG. 10. Thus, the pleats define a media normal flow area 360 that is substantially greater than the panel normal flow area 350. Essentially, the media normal flow area 360 is the sum of the areas of the various pleats measured in a plane normal to the flow direction 365. In one construction, the media normal flow area 360 for each filter panel 125 is greater than one square foot (0.09 sq meters) with sizes greater than two square feet (0.19 sq meters) being preferred. Test data shows that this flow area provides for a flow rate through each filter panel in excess of about 7 gallons per minute (26.5 liters per minute). More specifically, each filter panel 125 is configured to pass a liquid flow therethrough. The liquid flow is in excess of 3 gallons per minute per square foot (11.4 liters per minute per 0.09 sq. feet) and is at a pressure differential across the filter media in excess of 12 inches of water (3 kPa).

While the foregoing description should be read to include many variations of pleats, the following table illustrates the expected low end, the expected high end, and the expected nominal size of several parameters of the pleats. Of course variations in these parameters may be possible.

| Parameter | Low End | Nominal | High End |
| --- | --- | --- | --- |
| Cell size, in | 0.5 × 0.5 | 0.75 × 4 | 2 × 36 |
| (mm) | (12.7 × 12.7) | (19 × 102) | (51 × 914) |
| Pleat Height, inches | 0.1 | 1.0 | 6.0 |
| (mm) | (2.5) | (25.4) | (152) |
| Pleat Included Angle, degrees | 20 | 60 | 80 |
| Velocity past Cleaning Nozzles ft/min | 1 | 3 to 30 | 50 |
| (meters/min) | (0.3) | (0.9 to 9.1) | (15.25) |
| Head loss, inches of water | 0 | 12-24 | 36-48 |
| (meters of water) | (0) | (0.3-0.61) | (0.91-1.22) |
| Flux media normal, gpm/sq ft | 0 | 3-6 | 15 |
| (liters per minute/sq meter) | (0) | (122.2-244.5) | (611.2) |
| Solids Loading, lbs/day/sq ft | 0 | 2 | 20 |
| (kg/day/sq meter) | (0) | (9.58) | (95.8) |

It should be noted that the low end pleat height is based on a micropleat design with thin panels having many tiny pleats, while the high end design is based on a thick panel design. In addition, the low end included angle is possible due to the unexpected finding that solids can be easily removed from the valleys, and that the risk of being unable to clean the valleys was very low. The velocity past the cleaning nozzles is at least partially a function of the size of the discs with smaller discs allowing for higher angular velocities.

Figure 23:
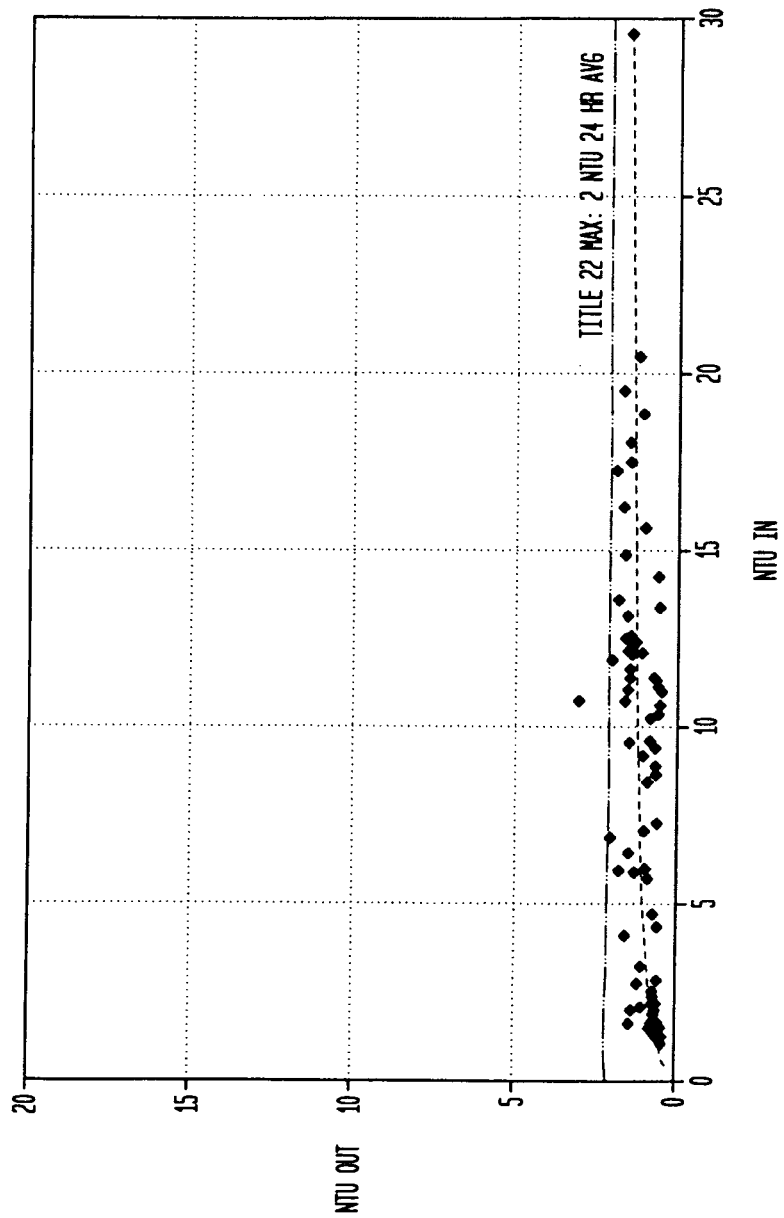
FIG. 23 is a graph illustrating the reduced turbidity of fluid that passes through a filter as illustrated herein.

While there are many variations of the design described herein, one filter has been field tested and produced a reduction in turbidity measured in Nephelometric Turbidity Units (NTU) as illustrated in the graph of FIG. 23. Of course other arrangements may provide better or worse performance depending on the particular arrangement.

It should be noted that the invention described herein is also well-suited for existing applications. For example, an existing filter can be modified to incorporate the present invention. Such a modification would increase the flow rate and reduce the pressure drop through the filter without increasing the footprint of the filter. In this application, the existing non-pleated filter media is removed from the drum. Filter supports are coupled to the drum and pleated filter panels are inserted into the filter supports to complete the modification. In preferred constructions, the filter supports are molded from plastic with other materials (e.g., metal) also being suitable for use.

Figure 35:
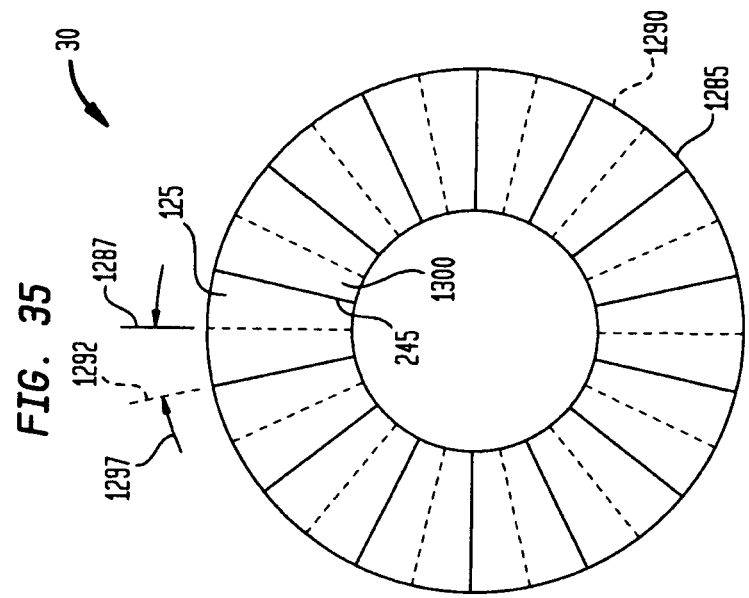
FIG. 35 is a front schematic illustration of the alternate arrangement of FIG. 34.
Figure 34:
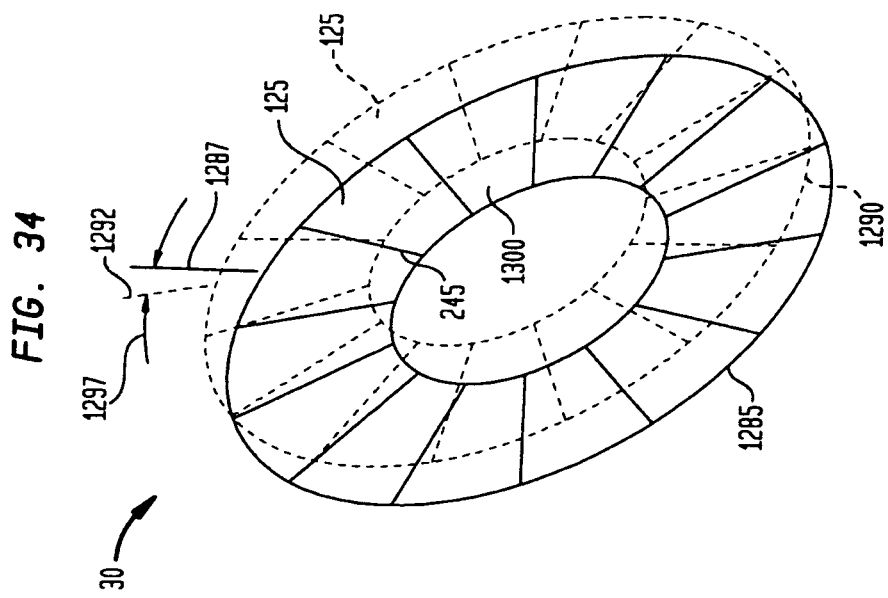
FIG. 34 is a perspective schematic illustration of an alternate arrangement wherein the filter panels of a disc are offset with respect to one another.

While most of the figures illustrate discs 30 that include filter panels 125 that are substantially aligned, FIGS. 34 and 35 illustrate another arrangement in which the filter panels 125 on a first side 1285 of the disc 30 are rotated with respect to the filter panels 125 on a second side 1290 (shown in broken lines) of the disc 30. In the arrangement of FIG. 34, the center axis 1287 for each panel 125 on the first side 1285 of disc 30 is offset relative to the center axis 1292 of each filter panel 125 on the second side 1290 of the disc 30 to form offset filter panel pairs. By way of example, the filter panel pairs may be offset by a first distance 1297 equal to approximately half of a filter pair 1300.

Thus, the invention provides, among other things, a new and useful filter panel 125 for use in a disc filter 10. The filter panel 125 includes pleated filter media 15 that increases the overall surface area per unit area that can be used for filtration, and retains the pleated shape of the media against the turbulent and viscous forces generated at high flow rates of liquid.

What is claimed is:

1. A filter device for filtering wastewater, the device comprising:
   a drum for receiving the wastewater, the drum including a plurality of drum apertures;
   a frame comprising a plurality of frame supports each having an attachment portion coupled to the drum and a radial strut portion extending from the attachment portion, each of the plurality of frame supports defining a single frame aperture that extends through the attachment portion and along an entire length of the radial strut portion to correspond with the shape of the frame support; and
   a plurality of adjacent filter segments positioned around the drum, each of the plurality of adjacent filter segments defining a cavity in fluid communication with at least one of the plurality of drum apertures and supported at a first side by a first frame support and at a second side by a second frame support,
   the plurality of frame apertures and cavities arranged to form a circumferential open fluid channel extending continuously around the drum to enable water to pass relatively unimpeded through the plurality of drum apertures and through the plurality of adjacent filter segments.

2. The filter device according to claim 1, wherein at least one of said plurality of drum apertures is aligned with said single frame aperture such that the at least one of said plurality of drum apertures is in fluid communication with said single frame aperture.

3. The filter device according to claim 1, wherein said drum includes a support section located between adjacent drum apertures and said single frame aperture straddles said support section such that at least portions of the adjacent drum apertures are in fluid communication with said single frame aperture.

4. The filter device according to claim 1, wherein said single frame aperture forms an inverted substantially T-shaped configuration.

5. The filter device according to claim 1, wherein said filter segments include filter media having a plurality of pleats.

6. The filter device according to claim 1, wherein a first filter segment comprises a first panel set and a second filter segment comprises a second panel set, and wherein filter panels from said first panel set are offset relative to filter panels of said second panel set.

7. The filter device of claim 1, wherein each of said single frame apertures and said cavities form a volume having a cross sectional area sized substantially equal to or greater than each of said plurality of drum apertures.

8. The filter device of claim 1, further comprising a plurality of caps configured to secure the plurality of adjacent filter segments, the caps removably secured to adjacent radial strut portions of the filter frame supports.

9. The filter device of claim 8, wherein ends of adjacent caps are connected to define a ring around an outer perimeter of the plurality of adjacent filter segments.

10. The filter device of claim 1, wherein each filter segment comprises first and second filter panels mounted in a filter frame support, the first and second filter panels spaced apart from each other.

11. The filter device of claim 10, wherein the filter frame support is constructed to support a bottom portion of the first and second filter panels.

12. The filter device of claim 11, wherein the attachment portion of the filter frame support comprises a first slot configured to removably receive the bottom portion of the first filter panel.

13. The filter device of claim 12, wherein the attachment portion of the filter frame support comprises a second slot configured to removably receive the bottom portion of the second filter panel.

14. The filter device of claim 11, wherein the filter frame support is constructed to support at least a portion of a side of the first and second filter panels.

15. The filter device of claim 14, wherein the radial strut portion of the filter frame support comprises a first internal groove configured to removably receive at least a portion of a side of the first filter panel.

16. The filter device of claim 14, wherein the radial strut portion of the filter frame support comprises a second internal groove configured to removably receive at least a portion of a side of the second filter panel.

17. The filter device of claim 13, wherein the radial strut portion of the filter frame support comprises a snap lock feature configured to support at least a portion of a side of the first and second filter panels.

* * * * *